United States Patent
Katsuyama

(10) Patent No.: US 9,849,668 B2
(45) Date of Patent: Dec. 26, 2017

(54) IMAGE PROCESSING DEVICE, IMAGE PROCESSING METHOD, AND INK JET RECORDING APPARATUS

(71) Applicant: FUJIFILM Corporation, Tokyo (JP)

(72) Inventor: Kimito Katsuyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/433,359

(22) Filed: Feb. 15, 2017

(65) Prior Publication Data

US 2017/0157919 A1 Jun. 8, 2017

Related U.S. Application Data

(63) Continuation of application No. PCT/JP2015/072789, filed on Aug. 11, 2015.

(30) Foreign Application Priority Data

Aug. 26, 2014 (JP) .................................. 2014-171479

(51) Int. Cl.
*B41J 2/045* (2006.01)
*B41J 2/52* (2006.01)

(52) U.S. Cl.
CPC ....... *B41J 2/04508* (2013.01); *B41J 2/04586* (2013.01); *B41J 2/52* (2013.01)

(58) Field of Classification Search
CPC ....... B41J 2/04508; B41J 2/04586; B41J 2/52
See application file for complete search history.

(56) References Cited

U.S. PATENT DOCUMENTS

| 2004/0051747 A1 | 3/2004 | Nunokawa et al. |
| 2008/0252673 A1 | 10/2008 | Wada et al. |
| 2010/0177137 A1 | 7/2010 | Kakutani |

(Continued)

FOREIGN PATENT DOCUMENTS

| CN | 103358694 A | 10/2013 |
| JP | H11-320861 A | 11/1999 |
| JP | 2002-096455 A | 4/2002 |

(Continued)

OTHER PUBLICATIONS

International Search Report issued in PCT/JP2015/072789; dated Oct. 6, 2015.

(Continued)

*Primary Examiner* — Bradley Thies
(74) *Attorney, Agent, or Firm* — Studebaker & Brackett PC

(57) ABSTRACT

Provided are an image processing device, an image processing method, and an ink jet recording apparatus that can prevent the occurrence of density unevenness, such as banding, regardless of a duty, without causing deterioration of image quality. A jetting rate indicating an ink jetting rate of each of a plurality of nozzles which jet ink in a recording head including the nozzles is determined. A nozzle pattern indicating which of the plurality of nozzles of the recording head is used to record each pixel of an image on a recording medium is determined. The jetting rate of the nozzle which records each pixel is reflected in a gradation value of each pixel of the image on the basis of the determination result of the jetting rate and the determination result of the nozzle pattern to convert the gradation value of each pixel.

11 Claims, 17 Drawing Sheets

(56) References Cited

U.S. PATENT DOCUMENTS

2011/0221816 A1* 9/2011 Miyamoto ............ B41J 2/2146
347/15

FOREIGN PATENT DOCUMENTS

| | | |
|---|---|---|
| JP | 2002-318673 A | 10/2002 |
| JP | 2003-320653 A | 11/2003 |
| JP | 2004-336379 A | 11/2004 |
| JP | 2006-159601 A | 6/2006 |
| JP | 2006-229809 A | 8/2006 |
| JP | 2008-221832 A | 9/2008 |
| JP | 2010-162770 A | 7/2010 |
| JP | 2011-189512 A | 9/2011 |
| JP | 2011-255594 A | 12/2011 |

OTHER PUBLICATIONS

Written Opinion issued in PCT/JP2015/072789; dated Oct. 6, 2015.
CN Office Action dated Sep. 4, 2017, from corresponding CN Appl No. 201580045199.2. with English translation, 10 pp.

* cited by examiner

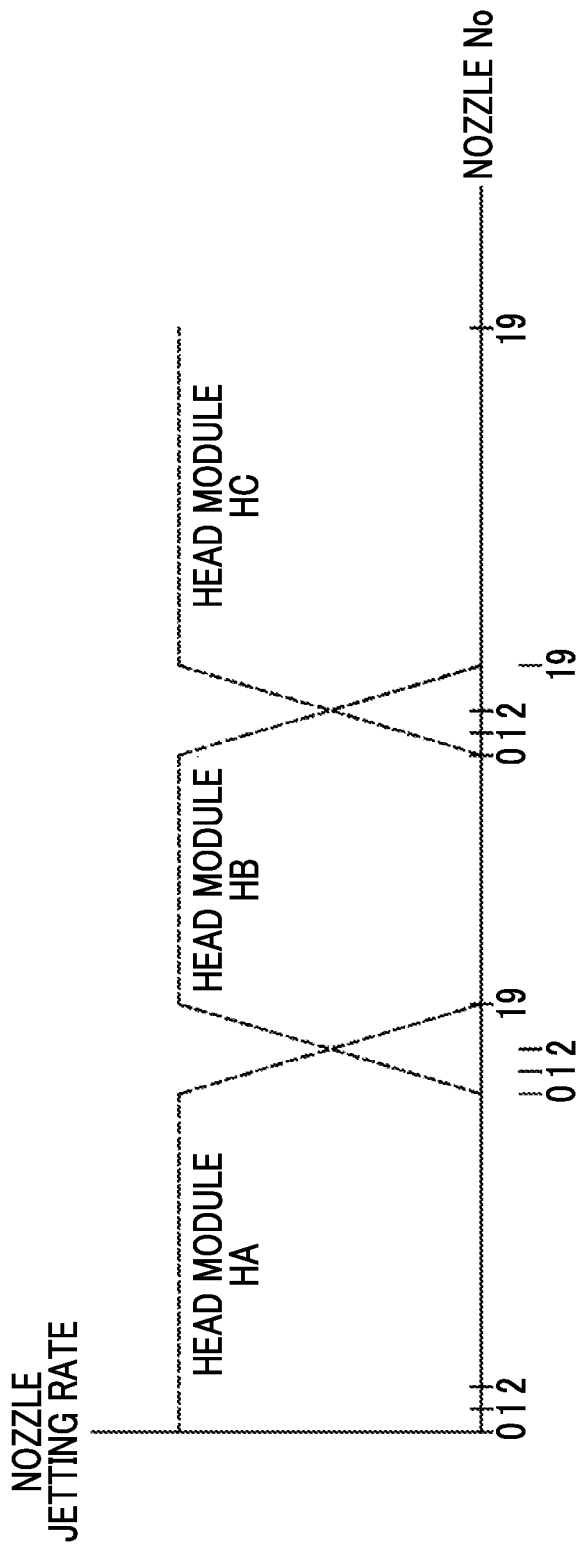

IMAGE PROCESSING DEVICE, IMAGE PROCESSING METHOD, AND INK JET RECORDING APPARATUS

CROSS-REFERENCE TO RELATED APPLICATIONS

This application is a Continuation of PCT International Application No. PCT/JP2015/072789 filed on Aug. 11, 2015, which claims priority under 35 U.S.C. §119(a) to Japanese Patent Application No. 2014-171479 filed on Aug. 26, 2014. Each of the above applications is hereby expressly incorporated by reference, in their entirety, into the present application.

BACKGROUND OF THE INVENTION

1. Field of the Invention

The present invention relates to an image processing device and an image processing method which are used for an ink jet recording apparatus and an ink jet recording apparatus comprising the image processing device.

2. Description of the Related Art

In recent years, an ink jet recording apparatus which jets ink from each nozzle of a recording head having a plurality of nozzles that jets the ink to a recording medium to record a desired image on the recording medium while moving the recording head with respect to the recording medium has come into widespread use.

A serial ink jet recording apparatus has been generally known as the ink jet recording apparatus. In the serial ink jet recording apparatus, a recording head jets ink to record an image in a region with a predetermined length in a sub-scanning direction while being moved in a main scanning direction. Then, a recording medium is moved by a predetermined distance in the sub-scanning direction and the recording head records an image in the next region in the same manner. Then, this process is repeatedly performed. In this way, images are recorded on the entire region of the recording medium.

The serial ink jet recording apparatus records images while repeating the movement (which is also referred to as printing pass) of the recording head in the main scanning direction a plurality of times. Therefore, the behavior of dots on the recording medium varies depending on errors in the recording position of each dot on the recording medium from each nozzle of the recording head, errors in the amount of ink jetted, or the recording order and time of dots. As a result, in some cases, density unevenness that is called "banding" in which density varies with the repetition period of each printing pass or the boundary between the printing passes is conspicuous occurs. When banding occurs, print quality deteriorates.

JP2002-096455A discloses an ink jet recording apparatus which thins out image data subjected to halftone processing, using a mask pattern corresponding to each nozzle, to thin out the nozzles that jet ink, when the ink is jetted from each nozzle of a recording head. In the ink jet recording apparatus, the mask pattern is set such that the proportion (that is, a jetting rate) of pixels recorded by the nozzles close to the end of the nozzle array of the recording head is less than that of the pixels recorded by the nozzles close to the center of the nozzle array. In this way, banding is prevented.

JP2010-162770A discloses an ink jet recording apparatus which performs halftone processing with an ordered dither method using a dither mask to control the jetting of ink from each nozzle of a recording head. In the ink jet recording apparatus, the threshold value of the dither mask is set such that the jetting rate of at least one of nozzle groups (including the outermost nozzles disposed at both ends) which are disposed at both ends of a nozzle column of a recording head is less than the jetting rate of an intermediate nozzle group which is disposed between the nozzle groups at both ends. In this way, banding is prevented.

SUMMARY OF THE INVENTION

However, the ink jet recording apparatus disclosed in JP2002-096455A has the problem that the granularity of an image recorded on a recording medium is reduced since the thinning process is performed using the mask pattern.

In the ink jet recording apparatus disclosed in JP2010-162770A, each nozzle of the recording head is in one-to-one correspondence with the threshold value of the dither mask and the jetting rate of each nozzle is controlled. Therefore, a nozzle error is repeated with a period corresponding to the size of the dither mask and unevenness occurs. For example, when a certain nozzle is bent, unevenness occurs due to the bent nozzle with a period corresponding to the size of the dither mask. In addition, in the ink jet recording apparatus, the threshold value of a specific pixel among the pixels corresponding to the nozzle groups which are disposed at both ends of the nozzle column is controlled (pixel recording is controlled). Therefore, the pixels (dots) around a specific pixel are densely recorded and distortion occurs in a dot distribution. In a case in which, among the pixels of the image recorded on a recording medium, specific pixels are sparsely recorded, it is difficult to obtain the effect of controlling the jetting rate of the nozzle group corresponding to the specific pixels at a low duty (the proportion of pixels in a dot-on state to the pixels of the image recorded on the recording medium).

The invention has been made in view of the above-mentioned problems and an object of the invention is to provide an image processing device, an image processing method, and an ink jet recording apparatus that can prevent the occurrence of density unevenness, such as banding, regardless of a duty, without causing deterioration of image quality.

In order to achieve the object of the invention, there is provided an image processing device comprising: a jetting rate determination unit that determines a jetting rate indicating an ink jetting rate of each of a plurality of nozzles which jet ink in a recording head including the nozzles; a nozzle pattern determination unit that determines a nozzle pattern indicating which of the plurality of nozzles of the recording head is used to record each pixel of an image on a recording medium; and a conversion unit that reflects the jetting rate of the nozzle which records each pixel in a gradation value of each pixel of the image on the basis of a determination result of the jetting rate determination unit and a determination result of the nozzle pattern by the nozzle pattern determination unit to convert the gradation value of each pixel.

According to the invention, the gradation value of each pixel of the image which is recorded on the recording medium by the recording head is converted into a gradation value in which the nozzle jetting rate has been reflected. Therefore, it is possible to prevent deterioration of image quality due to, for example, a reduction in the granularity of an image when density unevenness is prevented, the occurrence of unevenness when the nozzle jetting rate is controlled using a dither method, the distortion of a dot distribution, and difficulty in obtaining the effect of reducing the nozzle jetting rate in a case in which the duty is low.

According to another aspect of the invention, in the image processing device, the jetting rate determination unit determines the jetting rate of each nozzle of the recording head of a serial type which has a nozzle column including the nozzles arranged in a sub-scanning direction parallel to a transport direction of the recording medium and records the image on the recording medium while being moved with respect to the recording medium in the sub-scanning direction and a main scanning direction intersecting the sub-scanning direction. The nozzle pattern determination unit determines the nozzle pattern corresponding to the serial recording head. According to this structure, it is possible to prevent the occurrence of banding.

According to still another aspect of the invention, in the image processing device, the jetting rate determination unit determines the jetting rates such that the jetting rate of the nozzle which is disposed at an end of the nozzle column is less than the jetting rate of the nozzle which is disposed at the center of the nozzle column. According to this structure, it is possible to prevent the occurrence of banding.

According to yet another aspect of the invention, in the image processing device, the nozzle pattern determination unit determines the nozzle pattern on the basis of a scanning pattern when the recording head is moved with respect to the recording medium. According to this structure, the jetting rate of each nozzle that records each pixel can be reflected in the gradation value of each pixel of an image.

According to still yet another aspect of the invention, the image processing device further comprises a halftone processing unit that performs halftone processing for the gradation value of each pixel converted by the conversion unit to generate dot data which is used to control the jetting of the ink from each nozzle. According to this structure, it is possible to generate dot data on the basis of the gradation value in which the jetting rate of the nozzle has been reflected.

According to yet still another aspect of the invention, in the image processing device, the halftone processing unit performs the halftone processing using any one of a dither method, an error diffusion method, and a direct binary search method. It is possible to generate dot data using various methods.

In order to achieve the object of the invention, there is provided an ink jet recording apparatus comprising: a recording head having a plurality of nozzles that jet ink; a moving unit that moves the recording head with respect to a recording medium; the above-mentioned image processing device; and a jetting control unit that controls the jetting of the ink from the recording head on the basis of the dot data generated by the halftone processing unit.

In order to achieve the object of the invention, there is provided an image processing method comprising: a jetting rate determination step of determining a jetting rate indicating an ink jetting rate of each of a plurality of nozzles which jet ink in a recording head including the nozzles; a nozzle pattern determination step of determining a nozzle pattern indicating which of the plurality of nozzles of the recording head is used to record each pixel of an image on a recording medium; and a conversion step of reflecting the jetting rate of the nozzle which records each pixel in a gradation value of each pixel of the image on the basis of a determination result in the jetting rate determination step and a determination result of the nozzle pattern in the nozzle pattern determination step to convert the gradation value of each pixel.

According to another aspect of the invention, in the image processing method, in the jetting rate determination step, the jetting rate of each nozzle of the recording head of a serial type, which has a nozzle column including the nozzles arranged in a sub-scanning direction parallel to a transport direction of the recording medium and records the image on the recording medium while being moved with respect to the recording medium in the sub-scanning direction and a main scanning direction intersecting the sub-scanning direction, is determined. In the nozzle pattern determination step, the nozzle pattern corresponding to the serial recording head is determined.

According to still another aspect of the invention, in the image processing method, in the jetting rate determination step, the jetting rate of the nozzle which is disposed at an end of the nozzle column is less than the jetting rate of the nozzle which is disposed at the center of the nozzle column.

According to yet another aspect of the invention, the image processing method further comprises a halftone processing step of performing halftone processing for the gradation value of each pixel converted in the conversion step to generate dot data which is used to control the jetting of the ink from each nozzle.

The image processing device, the image processing method, and the ink jet recording apparatus according to the invention can prevent the occurrence of density unevenness, such as banding, regardless of a duty, without causing deterioration of image quality.

BRIEF DESCRIPTION OF THE DRAWINGS

FIG. 15B is a graph illustrating the nozzle jetting rate of each nozzle of the recording head.

DESCRIPTION OF THE PREFERRED EMBODIMENTS

[Overall Structure of Ink Jet Recording Apparatus]

Figure 1:
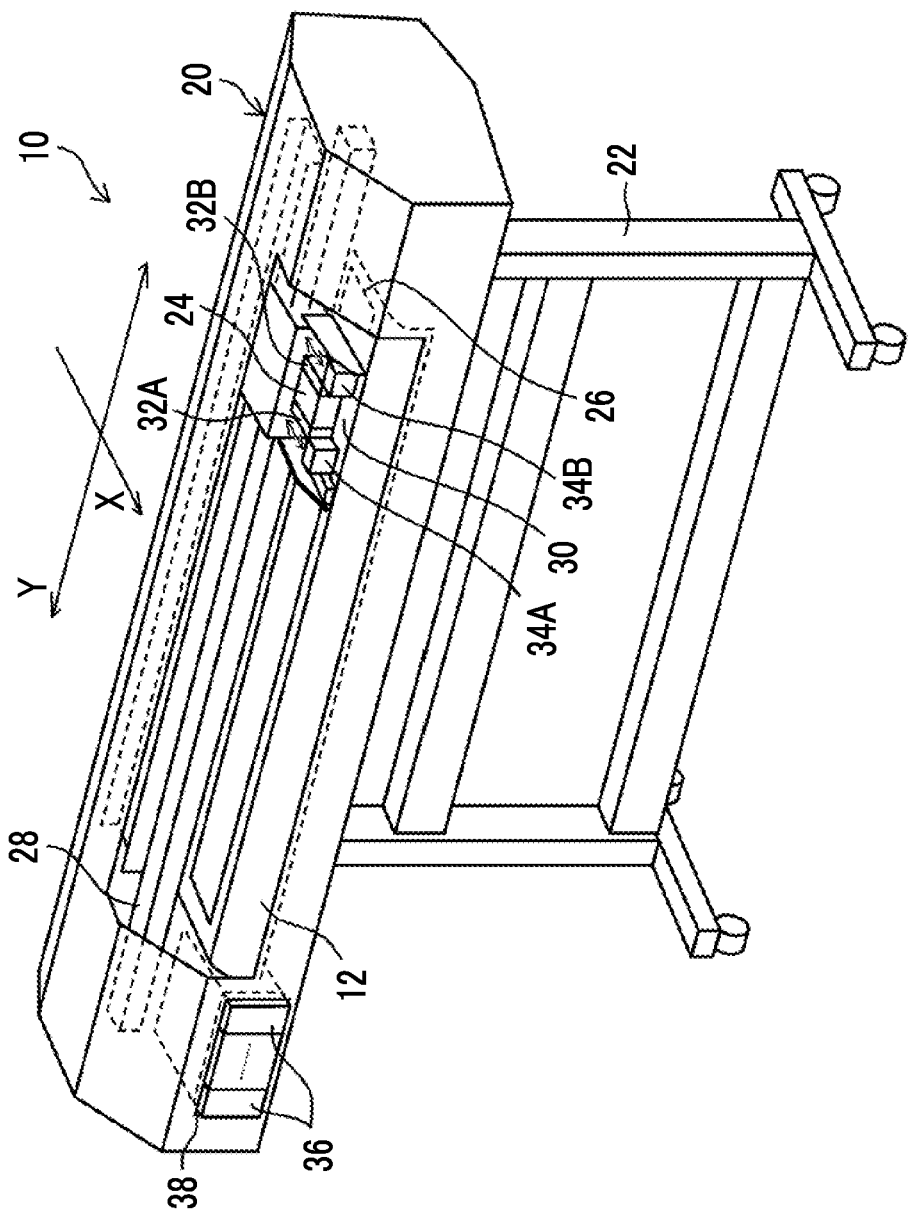
FIG. 1 is a perspective view illustrating the outward appearance of an ink jet recording apparatus.

FIG. 1 is a perspective view illustrating the outward appearance of an ink jet recording apparatus 10. The ink jet recording apparatus 10 is a wide format printer that records a color image on a recording medium 12 using ultraviolet-curable-type ink (liquid) corresponding to ink according to the invention.

The ink jet recording apparatus 10 comprises a device body 20 and supporting legs 22 that support the device body 20. The device body 20 includes a drop-on-demand recording head 24 that jets ink to the recording medium 12, a platen 26 that supports the recording medium 12, and a guide mechanism 28 and a carriage 30 that support the recording head 24 such that the recording head 24 can be moved.

The guide mechanism 28 is disposed above the platen 26 so as to extend along a scanning direction (Y direction) which intersects a transport direction (X direction) of the recording medium 12 and is parallel to a medium supporting surface of the platen 26. The carriage 30 is supported so as to be reciprocated in the Y direction along the guide mechanism 28. The reciprocating direction (Y direction) of the carriage 30 corresponds to a "main scanning direction" according to the invention and the transport direction (X direction) of the recording medium 12 corresponds to a "sub-scanning direction" according to the invention. The carriage 30 is reciprocated in the Y direction along the guide mechanism 28 to move the recording head 24 in the main scanning direction with respect to the recording medium 12. Therefore, the guide mechanism 28, the carriage 30, and a main scanning driving unit 116 (see FIG. 5), which will be described below, form a portion of a moving unit according to the invention.

The carriage 30 is provided with the recording head 24 and temporary hardening light sources 32A and 32B and main hardening light source 34A and 34B that irradiate ink on the recording medium 12 with ultraviolet rays. The recording head 24, the temporary hardening light sources 32A and 32B, and the main hardening light source 34A and 34B are integrally moved together with the carriage 30 along the guide mechanism 28.

The temporary hardening light sources 32A and 32B emit ultraviolet rays for temporarily hardening ink landed on the recording medium 12. The main hardening light sources 34A and 34B emit ultraviolet rays for completely hardening (mainly hardening) the temporarily hardened ink.

The type of recording medium 12 is not particularly limited. Various types of recording media can be used for ink jet recording.

Ink cartridges 36 and an attachment portion 38 for attaching the ink cartridges 36 are provided on the left side of the device body 20 in the front view of FIG. 1. The ink cartridge 36 is a replaceable ink tank which stores ultraviolet-curable-type ink. The ink cartridges 36 are provided so as to correspond to ink of each color that is used in the ink jet recording apparatus 10. The ink cartridges 36 of each color are connected to the recording head 24 through ink supply paths (not illustrated) which are independently formed. In a case in which the amount of ink of each color which remains is small, the ink cartridges 36 are replaced.

A maintenance portion for the recording head 24 is arranged on the right side of the device body 20 in the front view, which is not illustrated.

[Structure of Recording Medium Transport Path]

Figure 2:
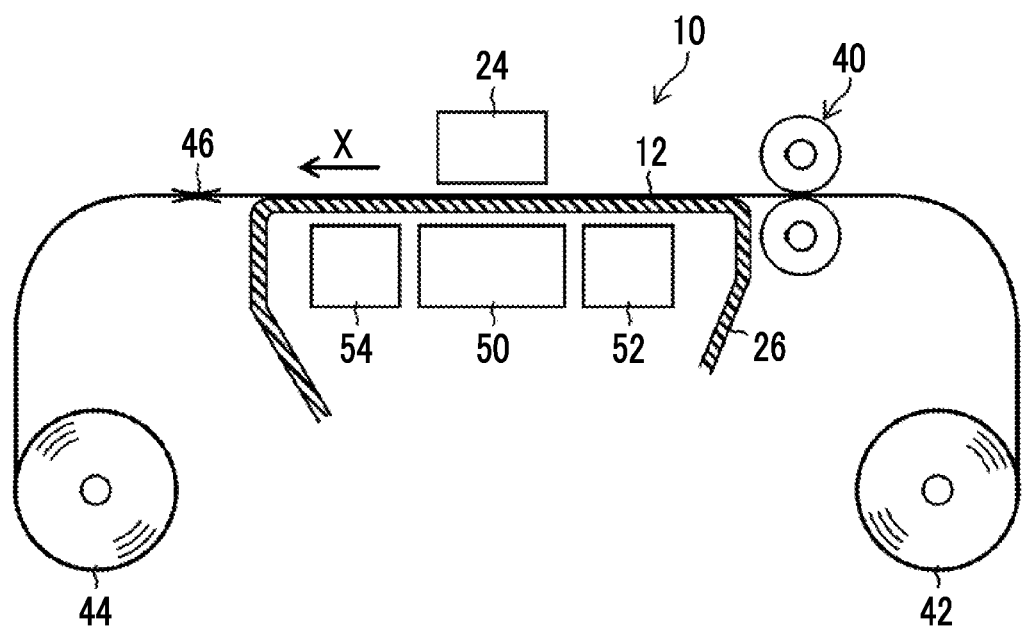
FIG. 2 is a diagram schematically illustrating a recording medium transport path of the ink jet recording apparatus.

FIG. 2 is a diagram schematically illustrating a recording medium transport path of the ink jet recording apparatus 10. As illustrated in FIG. 2, an upper surface of the platen 26 is a surface for supporting the recording medium 12. A pair of nip rollers 40 is provided on the upstream side of the platen 26 in the X direction.

The nip rollers 40 intermittently transport the recording medium 12 on the platen 26 in the X direction. The recording medium 12 transported from a supply-side roller 42 which transports a medium in a roll-to-roll manner is intermittently transported in the X direction by the nip rollers 40 provided at an inlet of a printing portion which is provided immediately below the recording head 24. In this way, since the recording medium 12 is moved in the X direction (sub-scanning direction) with respect to the recording head 24, the nip rollers 40 and a transport driving unit 114 (see FIG. 5), which will be described below, form a portion of the moving unit according to the invention. The recording head 24 records an image on the recording medium 12 which is intermittently transported by the nip rollers 40 and reaches the printing portion.

A winding roller 44 that winds the recording medium 12 having the image recorded thereon is provided on the downstream side of the printing portion in the X direction. A guide 46 for the recording medium 12 is provided on the transport path of the recording medium 12 between the printing portion and the winding roller 44.

A temperature adjustment unit 50 that adjusts the temperature of the recording medium 12, on which an image is being recorded, is provided on the rear surface of the platen 26 (a surface opposite to the surface for supporting the recording medium 12). A physical property value, such as the viscosity or surface tension of ink landed on the recording medium 12, is adjusted to a desired value by the adjustment of the temperature by the temperature adjustment unit 50 and it is possible to obtain a desired dot diameter. In addition, a pre-temperature adjustment unit 52 is provided on the upstream side of the temperature adjustment unit 50 in the X direction and a post-temperature adjustment unit 54 is provided on the downstream side of the temperature adjustment unit 50 in the X direction.

[Structure of Recording Head]

Figure 3:
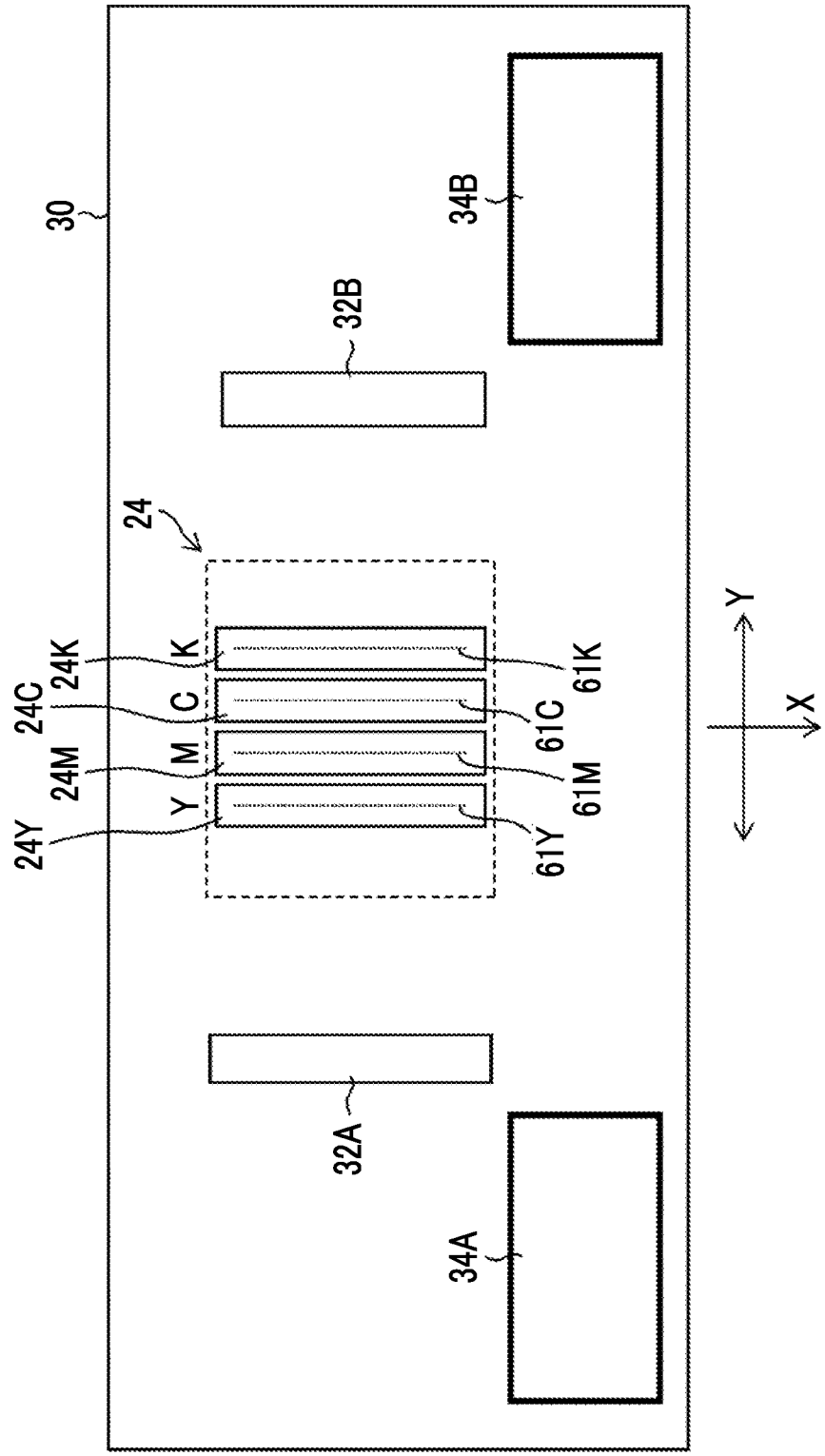
FIG. 3 is a perspective plan view illustrating an example of the arrangement of a recording head, a temporary hardening light source, and a main hardening light source on a carriage.
Figure 4:
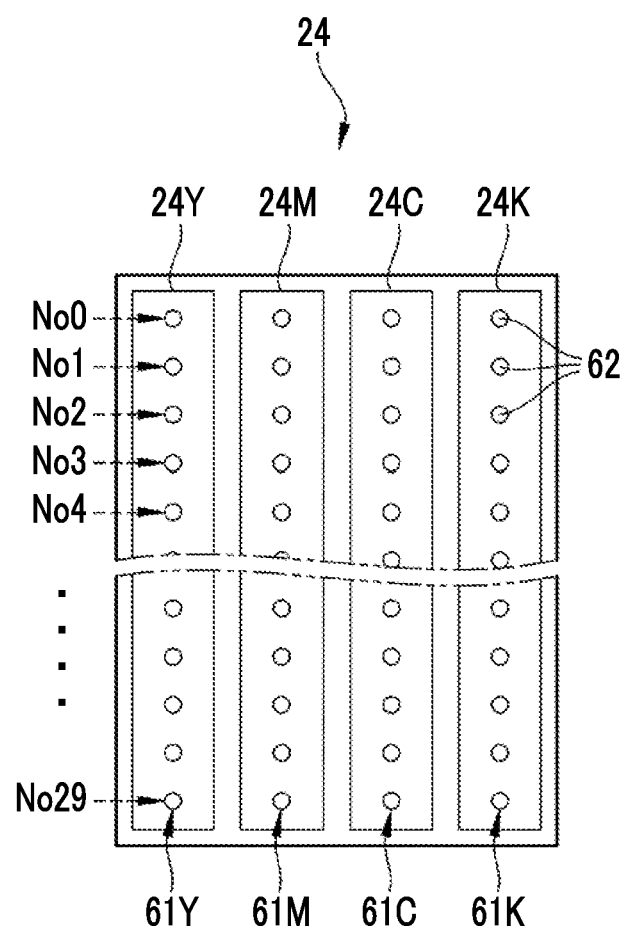
FIG. 4 is an enlarged view illustrating a recording head illustrated in FIG. 3.

FIG. 3 is a perspective plan view illustrating an example of the arrangement of the recording head 24, the temporary hardening light sources 32A and 32B, and the main hardening light sources 34A and 34B on the carriage 30. FIG. 4 is an enlarged view illustrating the recording head 24 illustrated in FIG. 3.

As illustrated in FIG. 3 and FIG. 4, the recording head 24 is provided with nozzle columns 61Y, 61M, 61C, and 61K having nozzles 62 which are arranged in the X direction and jet (discharge) ink of each color, that is, yellow (Y), magenta (M), cyan (C), and black (K), respectively.

In FIG. 3, the nozzle column is represented by a dotted line and the individual nozzles are not illustrated. In the following description, in some cases, the nozzle columns 61Y, 61M, 61C, and 61K are generically referred to as nozzle columns 61.

The type of ink color (the number of colors) or a combination of colors is not limited to this embodiment. For example, a nozzle column that jets ink of a special color other than C, M, Y, and K may be added. In addition, the order in which the nozzle columns corresponding to each color are arranged is not particularly limited.

In this embodiment, each nozzle column 61 corresponding to each color forms a head module and the head modules are arranged to form the recording head 24. Specifically, a head module 24Y having the nozzle column 61Y that jets yellow ink, a head module 24M having the nozzle column 61M that jets magenta ink, a head module 24C having the nozzle column 61C that jets cyan ink, and a head module 24K having the nozzle column 61K that jets black ink are arranged at equal intervals in the reciprocating direction (the main scanning direction or the Y direction) of the carriage 30.

A group (head group) of the head modules 24Y, 24M, 24C, and 24K corresponding to each color may be interpreted as a "recording head" or each module may be interpreted as a "recording head". Alternatively, ink flow paths corresponding to each color may be separately formed in one recording head 24 and one head may include nozzle columns that jet ink of a plurality of colors.

Each nozzle column 61 includes a plurality of nozzles 62 (see FIG. 4) which are arranged in the X direction at equal intervals. In this embodiment, 30 nozzles 62 are arranged in each nozzle column 61. In FIG. 4, No0, No1, . . . , No29 are nozzle Nos. indicating the numbers of the nozzles 62 forming each nozzle column 61 and are given from one end to the other end in the X direction.

The recording head 24 adopts, as an ink jet method, a method (piezo jet method) which jets ink using the deformation of a piezoelectric element (piezo actuator). Furthermore, the recording head 24 may adopt a method (thermal jet method) which heats ink using a heat generator (heating element), such as a heater, to generate air bubbles and jets ink using the pressure of the air bubbles, in addition to a method (electrostatic actuator method) using an electrostatic actuator.

The recording head 24 jets ink to the recording medium 12 to record an image in a region having a predetermined length in the sub-scanning direction (X direction) of the recording medium 12 while being moved in the main scanning direction (Y direction) by, for example, the guide mechanism 28 and the carriage 30. Then, when the recording medium 12 is moved by a predetermined distance in the sub-scanning direction after the image is recorded, the recording head 24 performs the same image recording process for the next region. Then, whenever the recording medium 12 is moved by a predetermined distance in the sub-scanning direction, the recording head 24 repeatedly performs the same image recording process to form images on the entire surface of the recording medium 12.

As such, the recording head 24 is a serial recording head. An example of the serial image recording is a multi-pass type in which a predetermined recording resolution is achieved by a plurality of processes of moving the recording head 24 in the main scanning direction (Y direction). In this embodiment, the multi-pass type is used.

[Structure of Control System of Ink Jet Recording Apparatus]

Figure 5:
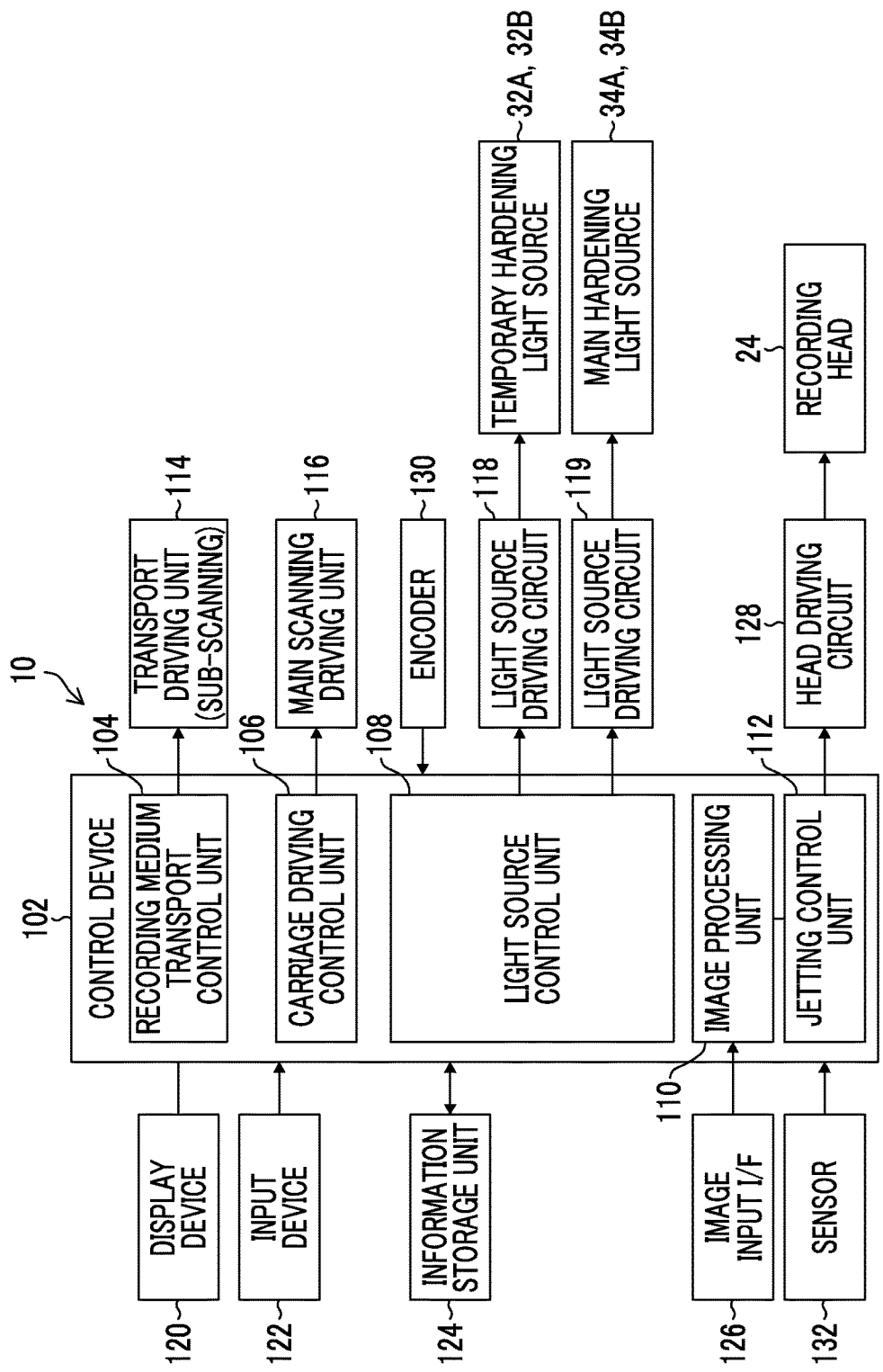
FIG. 5 is a block diagram illustrating the electrical structure of the ink jet recording apparatus.

FIG. 5 is a block diagram illustrating the electrical structure of the ink jet recording apparatus 10. As illustrated in FIG. 5, the ink jet recording apparatus 10 comprises a control device 102. For example, a computer comprising a central processing unit is used as the control device 102. The control device 102 executes various programs (see FIG. 8) read from an information storage unit 124 to control the overall operation of the ink jet recording apparatus 10.

The control device 102 includes a recording medium transport control unit 104, a carriage driving control unit 106, a light source control unit 108, an image processing unit 110, and a jetting control unit 112. These units are implemented by a hardware circuit, software, or a combination thereof.

The recording medium transport control unit 104 controls a transport driving unit 114 that transports the recording medium 12. The transport driving unit 114 includes a driving motor for driving the nip rollers 40 and a driving circuit for the driving motor. The recording medium 12 transported onto the platen 26 is intermittently transported in a swath width unit in the sub-scanning direction, with the reciprocating movement (the movement of a print path) of the recording medium in the main scanning direction by the recording head 24. The swath width is a length in the sub-scanning direction (X direction) which is determined by the repetition period of the reciprocating movement of the carriage 30 and is obtained by dividing the length of the nozzle column 61 in the sub-scanning direction by the total number of passes.

The carriage driving control unit 106 controls a main scanning driving unit 116 that moves the carriage 30 in the main scanning direction (Y direction). The main scanning driving unit 116 includes a driving motor which is connected to a moving mechanism for the carriage 30 and a control circuit for the driving motor.

An encoder 130 is attached to the driving motor of the main scanning driving unit 116 and the driving motor of the transport driving unit 114. The encoder 130 inputs a pulse signal corresponding to the number of rotations and the rotation speed of each driving motor to the control device 102. Then, the control device 102 can check the position of the carriage 30 and the position of the recording medium 12 on the basis of the pulse signal input from the encoder 130.

The light source control unit 108 controls the emission of light from the temporary hardening light sources 32A and 32B through a light source driving circuit 118 and controls the emission of light from the main hardening light sources 34A and 34B through a light source driving circuit 119.

The image processing unit 110 corresponds to an image processing device according to the invention and performs image processing for image data 127 (see FIG. 8) which is input through an image input interface (I/F) 126 to convert the image data into dot data for printing.

The jetting control unit 112 controls a head driving circuit 128 which drives the recording head 24 on the basis of the dot data generated by the image processing unit 110, thereby controlling the jet of ink from each nozzle 62 of the recording head 24.

The information storage unit 124 is, for example, a non-volatile memory and stores various programs or various kinds of data required to control the control device 102. For example, the information storage unit 124 stores, as the programs, a control program 124a (see FIG. 8) which is executed by each unit of the control device 102 and a scanning pattern program 124b (see FIG. 8). The scanning pattern program 124b is a program for recording an image using the multi-path method and defines the reciprocating movement (the movement of the print path) of the recording medium 12 which is intermittently transported in the sub-scanning direction (X direction) by the recording head 24 in the main scanning direction (Y direction) or the number of paths (the number of times scanning is repeated).

An input device 122, such as an operation panel, and a display device 120 are connected to the control device 102. The input device 122 is, for example, a keyboard, a mouse, a touch panel, or an operation button and is manually operated to input an external operation signal to the control device 102.

The display device 120 is, for example, a liquid crystal display. An operator operates the input device 122 to input printing conditions or to input and edit accessory information. Various kinds of information, such as the content of input or a search result, can be displayed on the display device 120 such that the operator can check the information.

A sensor 132 is attached to the carriage 30. The control device 102 can check the width of the recording medium 12 on the basis of a sensor signal which is input from the sensor 132.

[Description of Multi-Pass Image Recording (Drawing Method)]

Figure 6:
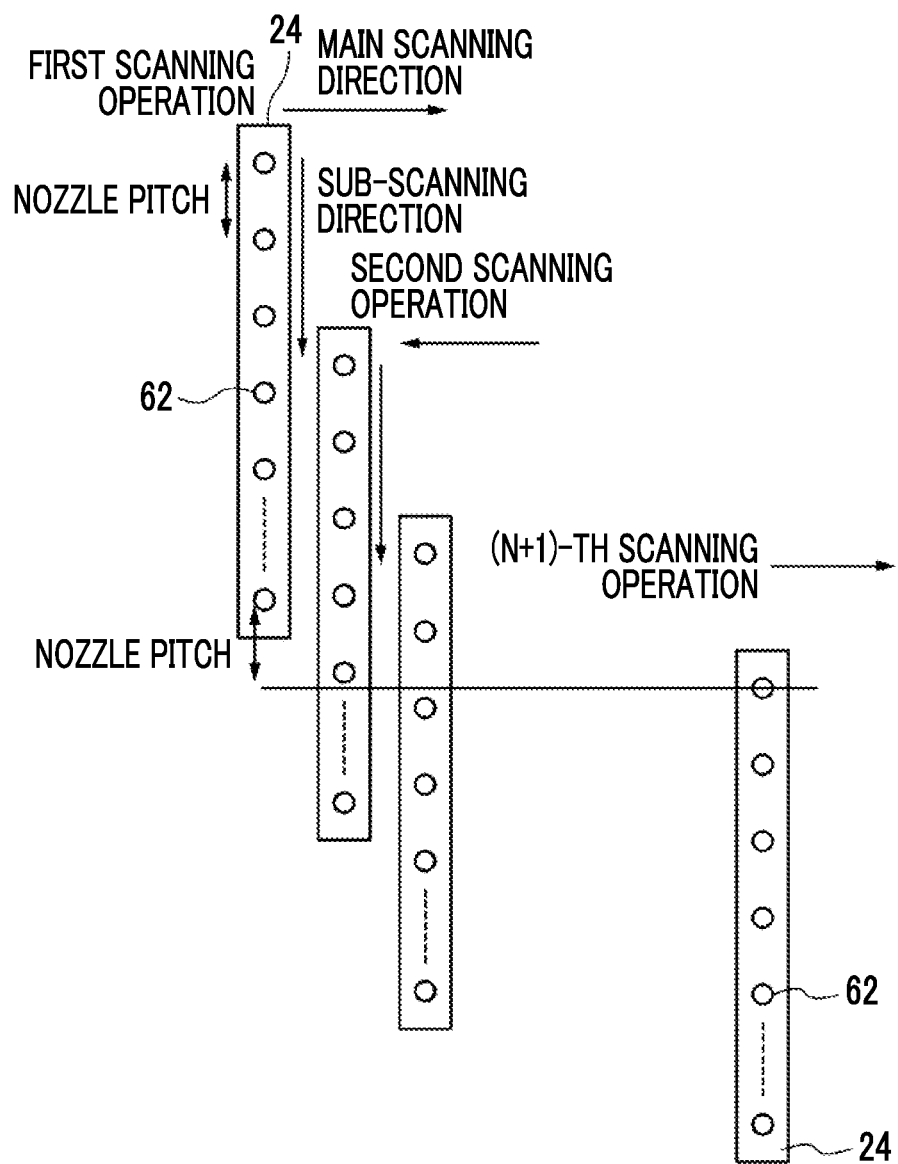
FIG. 6 is a diagram illustrating an example of multi-pass image recording (drawing method).

FIG. 6 is a diagram illustrating an example of the multi-pass image recording (drawing method) which is performed on the basis of the scanning pattern program 124b (see FIG. 8) while the recording head 24 is moved in the main scanning direction (Y direction). Here, for simplicity of explanation, an example in which one recording head 24 is used for recording will be described. In FIG. 6, for convenience of illustration, for the structure in which the recording medium 12 is intermittently transported in the sub-scanning direction (X direction), the recording medium 12 is stopped and the recording head 24 is intermittently moved in the sub-scanning direction with respect to the recording medium 12.

As illustrated in FIG. 6, when the recording head 24 is moved in the main scanning direction (the Y direction: the left-right direction in FIG. 6), ink is jetted from the nozzles 62. A two-dimensional image is recorded (drawn) on the recording medium 12 by a combination of the reciprocating movement of the recording head 24 in the main scanning direction and the intermittent transport of the recording medium 12 in the sub-scanning direction (the X direction: the vertical direction in FIG. 6).

In a case in which an image with a desired recording resolution is completed by N scanning operations, the relative positional relationship (the positional relationship in the sub-scanning direction) between the recording medium 12 and the recording head 24 in an (N+1) scanning operation is as illustrated in FIG. 6. That is, the following positional relationship is established: in order to perform N writing operations, the recording medium 12 is intermittently transported in the sub-scanning direction by the first writing operation, the second writing operation, the third writing operation, . . . and is connected to the position corresponding to the length of the head (nozzle column) in an (N+1)-th writing operation. In order to seamlessly connect N writing operations, an (N+1) scanning operation is performed at a position that is moved by a distance corresponding to "the length of the nozzle column+one nozzle pitch" from a sub-scanning position in the first scanning operation.

For example, a case is considered in which the recording head 24 having the nozzle column 61 having the nozzles 62 arranged at a nozzle arrangement density of 100 npi (an abbreviation for the number of nozzles per inch) is used to achieve a recording resolution of 600 dpi in the main scanning direction and 400 dpi in the sub-scanning direction using eight passes (eight writing operations), that is, two passes in the main scanning direction and four passes in the sub-scanning direction (two passes in the main scanning direction×four passes in the sub-scanning direction).

Here, an interval between jetting points (pixels) which is determined from the recording resolution is referred to as a "jetting point interval" (which is synonymous with a "pixel interval" and a "dot interval") and a lattice (matrix) indicating the position of recordable jetting points is referred to as a "jetting point lattice" (which is synonymous with a "pixel lattice).

In the case of a recording resolution of 600 dpi in the main scanning direction and 400 dpi in the sub-scanning direction, the jetting point interval in the main scanning direction is 25.4 (millimeters)/600≈42.3 micrometers and the jetting point interval in the sub-scanning direction is 25.4 (millimeters)/400=63.5 micrometers. This indicates that one cell (corresponding to one pixel) of the jetting point lattice has a size of "42.3 micrometers×63.5 micrometers". For the control of the transport of the recording medium 12 or the control of the jetting position (jetting time) from the recording head 24, the amount of transport or the position is controlled in the unit of the jetting point interval determined from the recording resolution. In some cases, the jetting point interval determined from the recording resolution is referred to as a "resolution pitch" or a "pixel pitch".

In a case in which N is 8 (two passes in the main scanning direction×four passes in the sub-scanning direction), 2×4 jetting point lattices are recorded by eight scanning operations (passes) such that jetting point lines (rasters (scanning lines)) in the main scanning direction are filled with ink by two scanning operations and jetting point lines (scanning lines) in the sub-scanning direction are filled with ink by four scanning operations.

Figure 7:
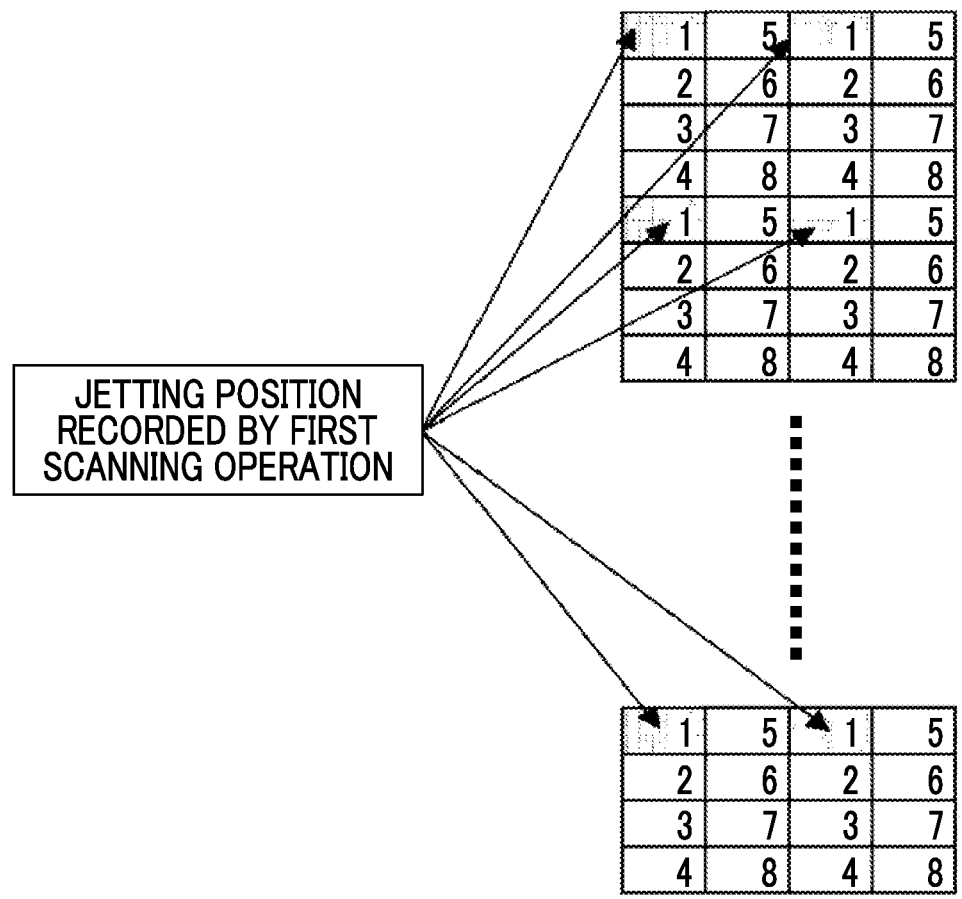
FIG. 7 is a diagram schematically illustrating the relationship between scanning numbers by eight drawing operations and jetting positions recorded by the scanning

FIG. 7 is a diagram schematically illustrating the relationship between scanning numbers (1 to 8) by eight writing operations, that is, eight drawing operations and jetting positions recorded by each scanning operation. In FIG. 7, cells having numbers 1 to 8 given thereto indicate jetting positions (pixel positions) recorded by the nozzles 62 and numbers 1 to 8 indicate scanning numbers given to the scanning operations for recording the pixel positions. For example, a cell (pixel) having number "1" given thereto indicates a jetting position which is recorded by the first scanning operation.

As can be seen from FIG. 7, in the arrangement distribution of numbers 1 to 8 indicating the order of the scanning operations for recording each jetting position, a lattice of "2×4", that is, a lattice of 2 in the main scanning direction and 4 in the sub-scanning direction is a basic unit of repetition. The lattice of "2×4" is referred to as a "basic unit lattice" or a "2×4 lattice". A method for filling the 2×4 lattice (jetting order) is not limited to that illustrated in FIG. 7 and various methods can be assumed.

[Function of Image Processing Unit]

Figure 8:
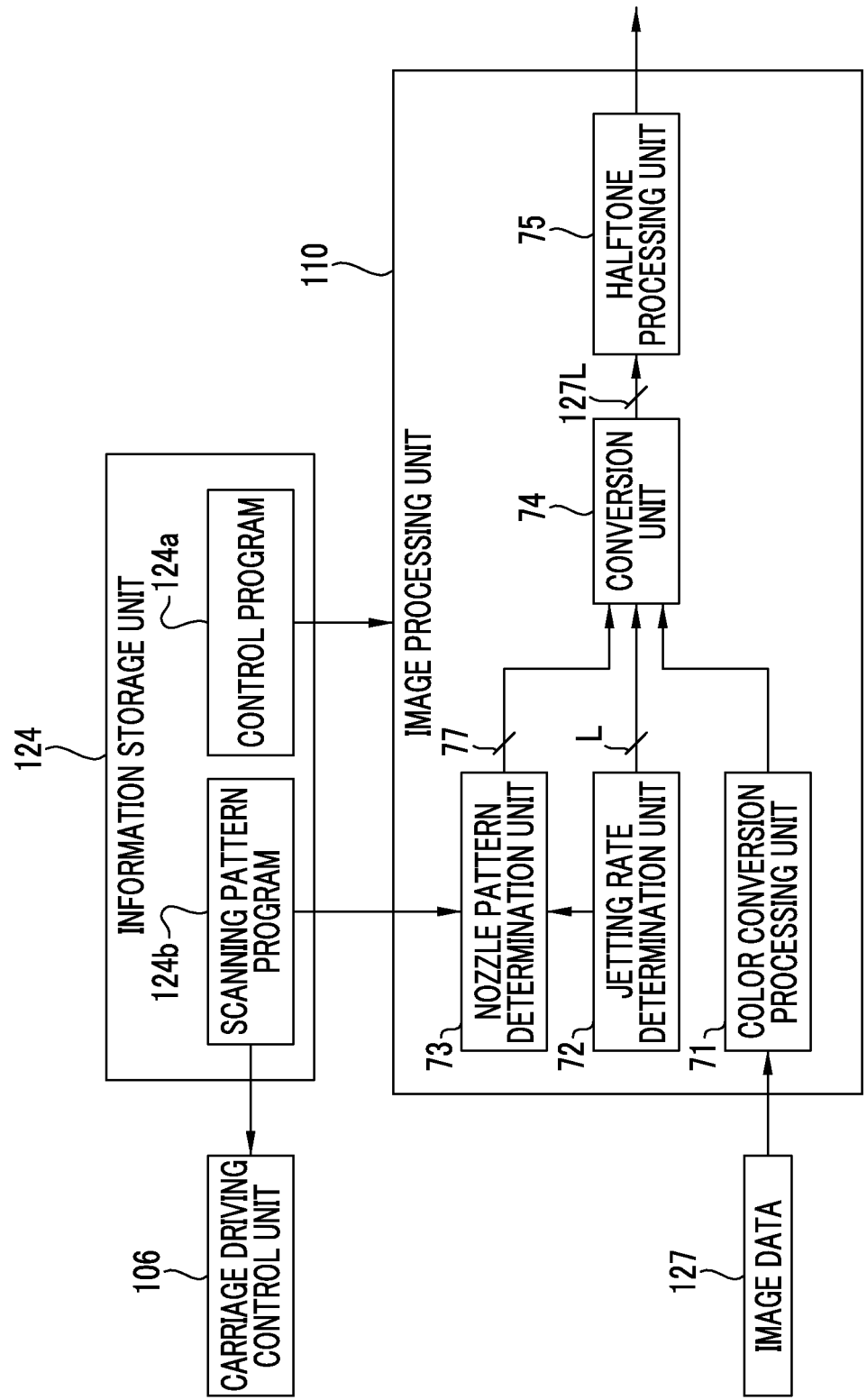
FIG. 8 is a functional block diagram illustrating an image processing unit.

FIG. 8 is a functional block diagram illustrating the image processing unit 110. As illustrated in FIG. 8, the image processing unit 110 executes the control program 124a stored in the information storage unit 124 to function as a color conversion processing unit 71, a jetting rate determination unit 72, a nozzle pattern determination unit 73, a conversion unit 74, and a halftone processing unit 75.

The color conversion processing unit 71 converts, for example, 8-bit red, green, and blue (RGB) image data 127 which is input from the image input I/F 126 into 8-bit CMYK image data 127. Then, the color conversion processing unit 71 outputs the converted image data 127 of each color to the conversion unit 74. In a case in which the image data 127 input from the image input I/F 126 is CMYK image data, the color conversion processing unit 71 may be omitted. In addition, a gradation transformation process may be performed for the image data 127 after the color conversion process such that coloring characteristics defined by the ink jet recording apparatus 10 are obtained, which is not illustrated in the drawings.

The jetting rate determination unit 72 determines nozzle jetting rate data L indicating the nozzle jetting rate (which corresponds to a jetting rate according to the invention and is also referred to as a nozzle use rate) of each nozzle 62 of the recording head 24 and outputs the determination result to the conversion unit 74. Here, the "nozzle jetting rate" is the percentage of the nozzles 62 which jet ink (the percentage of the recording pixels). Specifically, the "nozzle jetting rate" is the proportion of the use rate of each nozzle 62 (or the amount of ink jetted or the number of pixels) when the jetting rate is reflected to the use rate ("1.0" or "100%") of each nozzle 62 (or the amount of ink jetted or the number of pixels) when a solid pattern (without a space) with a certain density is recorded without reflecting the jetting rate.

Here, the use rates of the nozzles 62 (or the amounts of ink jetted or the numbers of pixels) when the solid pattern with a certain density is recorded without reflecting the jetting rate are substantially equal to each other. Therefore, the densities of the regions recorded by the nozzles 62 are substantially equal to each other. In contrast, the use rates of the nozzles 62 (or the amounts of ink jetted or the numbers of pixels) when the solid pattern with a certain density is recorded while the jetting rate is reflected are different each other. Therefore, the densities of the regions recorded by the nozzles 62 are different from each other. That is, the jetting rate determination unit 72 sets at least two different types of jetting rates such that at least two different types of density are included in the densities of the regions recorded by a plurality of nozzles 62.

Figure 9:
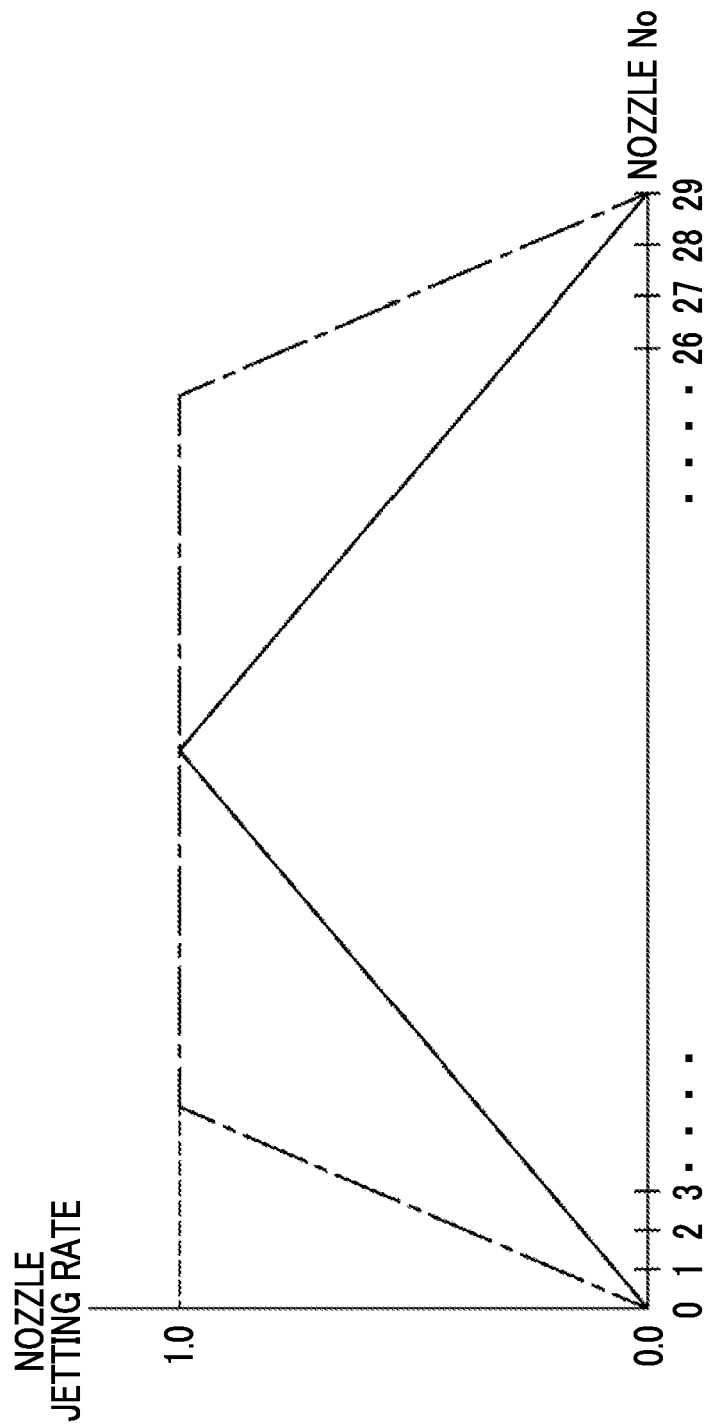
FIG. 9 is a diagram illustrating an example of nozzle jetting rate data.

FIG. 9 is a diagram illustrating an example of the nozzle jetting rate data L determined by the jetting rate determination unit 72 and illustrates the nozzle jetting rate of each nozzle No. In FIG. 9, the nozzle jetting rate of the nozzle 62 which is disposed at the center of the nozzle column 61 is set to "1.0". That is, this means that the use rate of the nozzle 62 disposed at the center of the nozzle column 61 (or the amount of ink jetted by the nozzle or the number of pixels) is equal to the use rate of the nozzle (or the amount of ink jetted by the nozzle or the number of pixels) when the jetting rate is not reflected.

As illustrated in FIG. 9, in order to prevent banding similarly to JP2002-096455A and JP2010-162770A, the nozzle jetting rate of the nozzle 62 which is disposed at the end of the nozzle column 61 is set to be less than the nozzle jetting rate of the nozzle 62 which is disposed at the center of the nozzle column 61. For example, as represented by a solid line in FIG. 9, the nozzle jetting rate is set such that it gradually increases from the nozzles 62 (No0 and No29) at both ends of the nozzle column 61 to the central nozzles 62 (No14 and No15). However, the setting of the nozzle jetting rate is not limited thereto. Various setting methods may be used. For example, as represented by a one-dot chain line in FIG. 9, the nozzle jetting rates of the nozzles 62 disposed at both ends of the nozzle column 61 are set to a small value and the nozzle jetting rates of the nozzles 62 disposed between both ends are set to "1.0".

Since the nozzle jetting rate of the nozzle 62 which is disposed at the end of the nozzle column 61 is set to be less than the nozzle jetting rate of the nozzle 62 which is disposed at the center of the nozzle column 61, the density of the region recorded by the nozzle 62 which is disposed at the end of the nozzle column 61 is less than the density of the region recorded by the nozzle 62 which is disposed at the center of the nozzle column 61 even in a case in which a solid pattern with a certain density is recorded.

In addition, the user can arbitrarily set the nozzle jetting rate of each nozzle 62. For example, the user can input the nozzle jetting rate of each nozzle 62 to the control device 102, using the input device 122, or can select a desired pattern from a plurality of types of predetermined nozzle jetting rate patterns of each nozzle 62. The jetting rate determination unit 72 determines the nozzle jetting rate of each nozzle 62 and generates the nozzle jetting rate data L, in response to an instruction which is input to the input device 122 from the user.

Returning to FIG. 8, the nozzle pattern determination unit 73 determines a nozzle pattern 77 (see FIG. 10) indicating which of the nozzles 62 of the recording head 24 is used to record each pixel of the image that is recorded on the recording medium 12 by the recording head 24 on the basis of the image data 127.

First, the nozzle pattern determination unit 73 determines a scanning pattern when the recording head 24 is moved in the main scanning direction (Y direction) and the subscanning direction (X direction) with respect to the recording medium 12, with reference to the scanning pattern program 124*b* stored in the information storage unit 124. As described above, since the scanning pattern program 124*b* defines the reciprocating movement of the recording head 24 in the main scanning direction with respect to the recording medium 12 which is intermittently transported in the subscanning direction or the number of passes, the nozzle pattern determination unit 73 can determine the scanning pattern of the recording head 24 from the scanning pattern program 124*b*. Therefore, it is possible to determine which of the nozzles 62 of the recording head 24 records each pixel of an image based on the image data 127 on the recording medium 12, on the basis of the scanning pattern. The nozzle pattern determination unit 73 determines the nozzle pattern 77 on the basis of the scanning pattern of the recording head 24 and outputs the determination result of the nozzle pattern 77 to the conversion unit 74.

A method for determining the nozzle pattern 77 is not limited to the determination method based on the scanning pattern program 124*b* and various known methods may be used. The nozzle pattern 77 may be determined whenever an image recording process is performed or it may be determined when the ink jet recording apparatus 10 is operated first and may be stored in the information storage unit 124 together with the scanning pattern program 124*b*. Alternatively, the nozzle pattern 77 may be stored in the information storage unit 124 in advance. That is, the nozzle pattern 77 can be determined by the scanning pattern program 124*b*, without depending on an image. Therefore, the nozzle pattern 77 can be stored in the information storage unit 124 together with the scanning pattern program 124*b* in advance.

Figure 10:
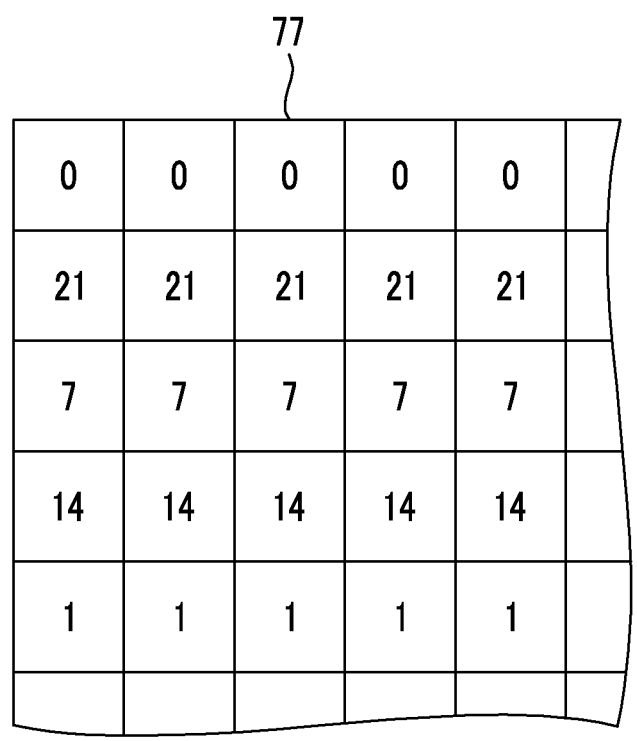
FIG. 10 is a diagram schematically illustrating an example of a nozzle pattern.

FIG. 10 is a diagram schematically illustrating an example of the nozzle pattern 77. As illustrated in FIG. 10, in the nozzle pattern, the numbers of the nozzles 62 which record each pixel of the image based on the image data 127 are determined. In FIG. 10, each cell having a number given thereto indicates each pixel of the image and the number in each cell indicates the number of the nozzle 62 which records a pixel.

Returning to FIG. 8, the conversion unit 74 reflects the nozzle jetting rate of the nozzle 62, which records each pixel, to each of the gradation values (0 to 255) of each pixel of the image data 127 of each of C, M, Y, and K which is input from the color conversion processing unit 71 and converts the gradation value of each pixel to generate jetting-rate-reflected image data 127L of each color. Specifically, the conversion unit 74 converts the gradation of each pixel of the image data 127 to generate the jetting-rate-reflected image data 127L, on the basis of the nozzle pattern 77 input from the nozzle pattern determination unit 73 and the nozzle jetting rate data L input from the jetting rate determination unit 72.

Figure 11:
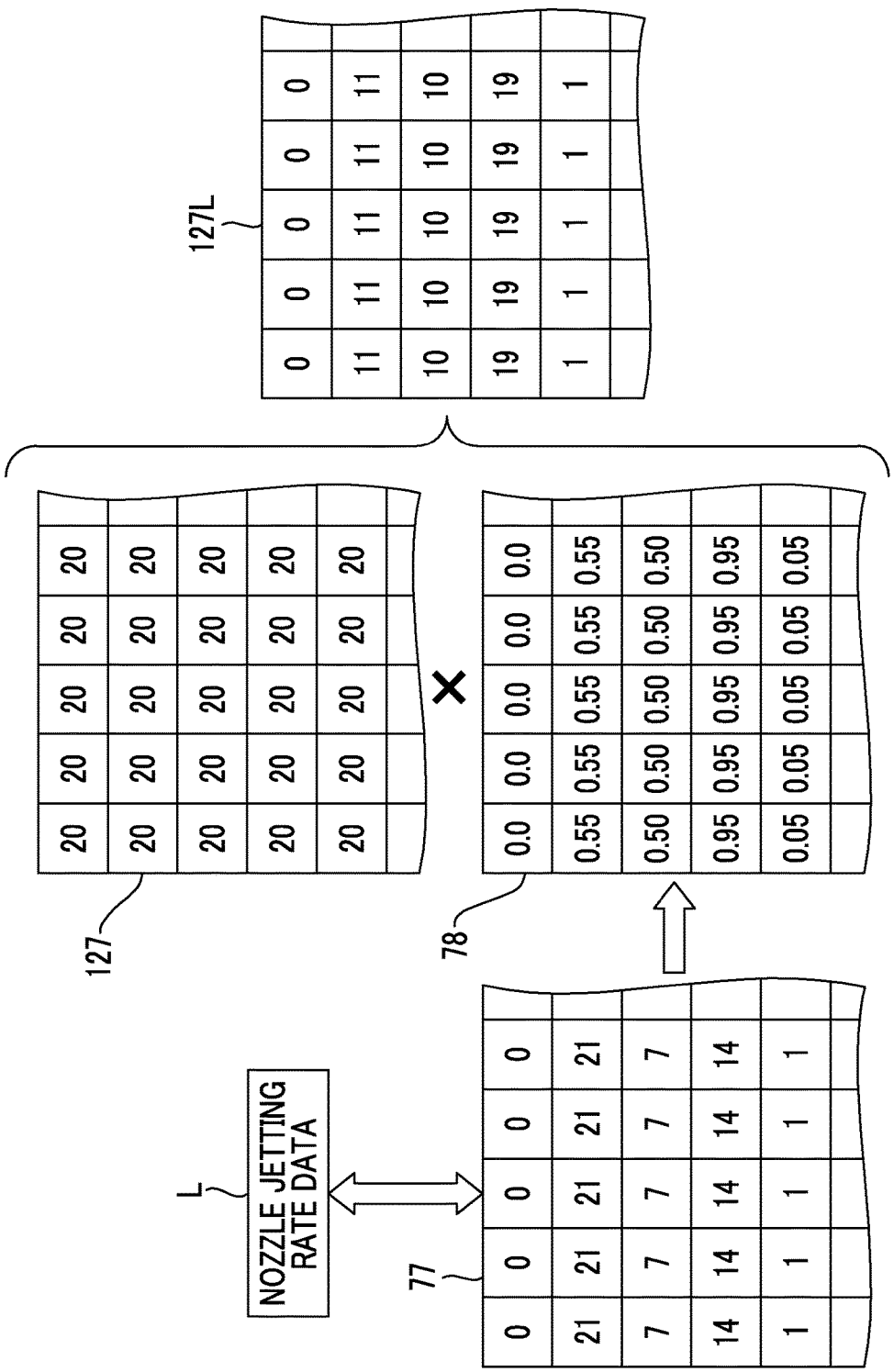
FIG. 11 is a diagram illustrating a process of generating jetting-rate-reflected image data.

FIG. 11 is a diagram illustrating a process of generating the jetting-rate-reflected image data 127L which is performed by the conversion unit 74. As illustrated in FIG. 11, first, the conversion unit 74 compares the nozzle pattern 77 with the nozzle jetting rate data L and calculates a jetting rate pattern 78 indicating the relationship between each pixel of the image data 127 and the nozzle jetting rate of the nozzle 62 which records each pixel.

In this embodiment, in the nozzle jetting rate data L (see FIG. 9), it is assumed that the nozzle jetting rates of nozzle No0, nozzle No1, . . . , nozzle No7, . . . , nozzle No14, . . . , nozzle No21, . . . are "0.0", "0.05", . . . , "0.50", . . . , "0.95", . . . , "0.55", respectively. In FIG. 11, in the jetting rate pattern 78, each cell having a number given thereto indicates each pixel of an image and the number in each cell indicates the nozzle jetting rate of the nozzle 62 which records a pixel. The nozzle jetting rate is determined for each pixel of the image data 127 on the basis of the jetting rate pattern 78.

Then, the conversion unit 74 multiplies the gradation value of each pixel of the image data 127 by the nozzle jetting rate of the jetting rate pattern 78 corresponding to each pixel to convert the gradation value of each pixel of the image data 127, thereby generating the jetting-rate-reflected image data 127L. In this embodiment, for ease of understanding of the gradation value conversion process, all of the gradation values of the pixels of the image data 127 are set to "20".

For example, since the nozzle jetting rate of the nozzle 62 with nozzle No0 is "0.0", the conversion unit 74 converts the gradation value of the pixel recorded by the nozzle 62 with nozzle No0 from "20" to "0" (=20×0.0). Since the nozzle jetting rate of the nozzle 62 with nozzle No1 is "0.05", the conversion unit 74 converts the gradation value of the pixel recorded by the nozzle 62 with nozzle No1 from "20" to "1" (=20×0.05). The conversion unit 74 further converts the gradation values of the pixels recorded by the nozzles 62 with nozzle No7, nozzle No14, and nozzle No21 from "20" to "10", "19", and "11", respectively. Then, the conversion unit 74 converts the gradation values of the pixels recorded by the nozzles 62 with the other nozzle Nos. using the same method as described above.

As such, the conversion unit 74 multiplies the gradation value of each pixel of the CMYK image data 127 by the nozzle jetting rate to convert the gradation value of each pixel into a gradation value in which the nozzle jetting rate has been reflected. In this way, the jetting-rate-reflected image data 127L is generated for each of C, M, Y, and K. In the jetting-rate-reflected image data 127L illustrated in FIG. 11, each cell having a number given thereto indicates each pixel of the image and the number in each cell indicates the converted gradation value of the pixel. Then, the conversion unit 74 outputs the jetting-rate-reflected image data 127L of each of C, M, Y, and K to the halftone processing unit 75 (see FIG. 8).

Here, the gradation value of each pixel of the image data 127 is multiplied by the nozzle jetting rate in order to reflect the nozzle jetting rate in the image data 127. However, there are various reflection methods. For example, the reflection method may be integrated with a gradation transformation process for obtaining coloring characteristics defined by the ink jet recording apparatus 10. That is, the color conversion processing unit 71 may perform only the process of converting the RGB image data 127 into the CMYK image data 127 and the conversion unit 74 may perform the gradation transformation process for obtaining the coloring characteristics defined by the ink jet recording apparatus 10 for the converted CMYK image data 127 and then perform a process corresponding to the process of multiplying the gradation value of each pixel of the gradation-transformed CMYK image data 127 by the nozzle jetting rate. In this case, the reflection of the nozzle jetting rate is non-linear conversion which is the integration of gradation transformation and the multiplication of the nozzle jetting rate. In a case in which the reflection of the nozzle jetting rate is performed as non-linear conversion in this way, the reflection may be performed, using a function that has, as arguments, the gradation value of each pixel of the image data 127 and the nozzle jetting rate of each pixel in the jetting rate pattern 78 (or the nozzle No of each pixel of the nozzle pattern 77 and the nozzle jetting rate data L) and has the gradation value in which the nozzle jetting rate has been reflected as an output, or a conversion table.

In a case in which the nozzle pattern 77 is stored in advance in the information storage unit 124 together with the scanning pattern program 124b, the jetting rate pattern 78 may be determined in advance on the basis of the nozzle pattern 77 and the nozzle jetting rate data L and then stored in the information storage unit 124. For example, the jetting rate pattern 78 for each combination of the scanning pattern program 124b and a plurality of types of nozzle jetting rate data L for each nozzle 62 may be determined and stored. Alternatively, when the user determines arbitrary nozzle jetting rate data L, the jetting rate pattern 78 for a combination of the determined nozzle jetting rate data L and the scanning pattern program 124b may be determined and stored.

Returning to FIG. 8, the halftone processing unit 75 performs halftone processing for the jetting-rate-reflected image data 127L of each of C, M, Y, and K which is input from the conversion unit 74 to generate dot data that is used to control the jetting of ink from each nozzle 62. In this embodiment, the dot data is binary data (in a dot-on state and a dot-off state). In addition, multi-valued data corresponding to the type of dot size (for example, a large dot, a medium dot, and a small dot) may be used as the dot data.

In a case in which there are a plurality of types of dot sizes (multiple values), the image data of each of C, M, Y, and K is converted into image data of each of C, M, Y, and K corresponding to each dot size, and halftone processing is performed, after the image data of each of C, M, Y, and K corresponding to each dot size is converted, the gradation value of each pixel of the CMYK image data corresponding to each dot size may be converted into a gradation value in which the nozzle jetting rate has been reflected and the jetting-rate-reflected image data 127L of each of C, M, Y, and K corresponding to each dot size may be generated.

A known method is used as the halftone processing method. For example, the halftone processing unit 75 performs the halftone processing using any one of a dither method, an error diffusion method, and a direct binary search method [DBS method].

The dither method compares the threshold value of a dither mask with the gradation value of each pixel of the jetting-rate-reflected image data 127L and determines whether to turn on or off a dot.

The error diffusion method compares a threshold value with an input value (the sum of the diffusion errors between the gradation value of each pixel of the jetting-rate-reflected image data 127L and the processed peripheral pixels) in each pixel and determines whether to turn on or off a dot of each pixel on the basis of the comparison result. In addition, the difference between the gradation value corresponding to the turn-on or turn-off of the determined dot and an input value is used as a quantization error and is diffused to unprocessed pixels in the vicinity of the pixel to be processed at a predetermined ratio.

The DBS method convolves a visual transfer function (VTF) indicating human visual characteristics or other gradation functions (Gaussian functions) to an input image (jetting-rate-reflected image data 127L) to generate an input gradation image. Then, a predetermined number of dots are arranged and a VTF or other gradation functions are convolved to generate an output gradation image. Then, the replacement of dots is repeated such that the difference (the sum of squares of each pixel difference) between the output gradation image and the input gradation image is reduced. Various methods are used to determine "a predetermined number of dots". For example, the following methods can be used: a method which determines whether to turn on or off dots in the jetting-rate-reflected image data 127L using the dither method and calculates the number of dots to be turned on; and a method which determines the relationship between each input gradation value and the density of dots to be turned on (the number of dots to be turned on per one pixel) in advance, stores the relationship as a table in the information storage unit 124, totals the density of the dots to be turned on corresponding to the gradation value of each pixel of the jetting-rate-reflected image data 127L, and calculates the number of dots to be turned on.

After performing the halftone processing, using any one of the dither method, the error diffusion method, and the DBS method, to generate dot data, the halftone processing unit 75 outputs the dot data to the jetting control unit 112 (see FIG. 5). In a case in which there are a plurality of types of dot sizes (multiple values), the halftone process method may be used according to the type of dot size. For example, halftone processing may be performed for a large dot using the error diffusion method and may be performed for a medium dot and a small dot using the dither method.

[Image Recording Process of Ink Jet Recording Apparatus]

Figure 12:
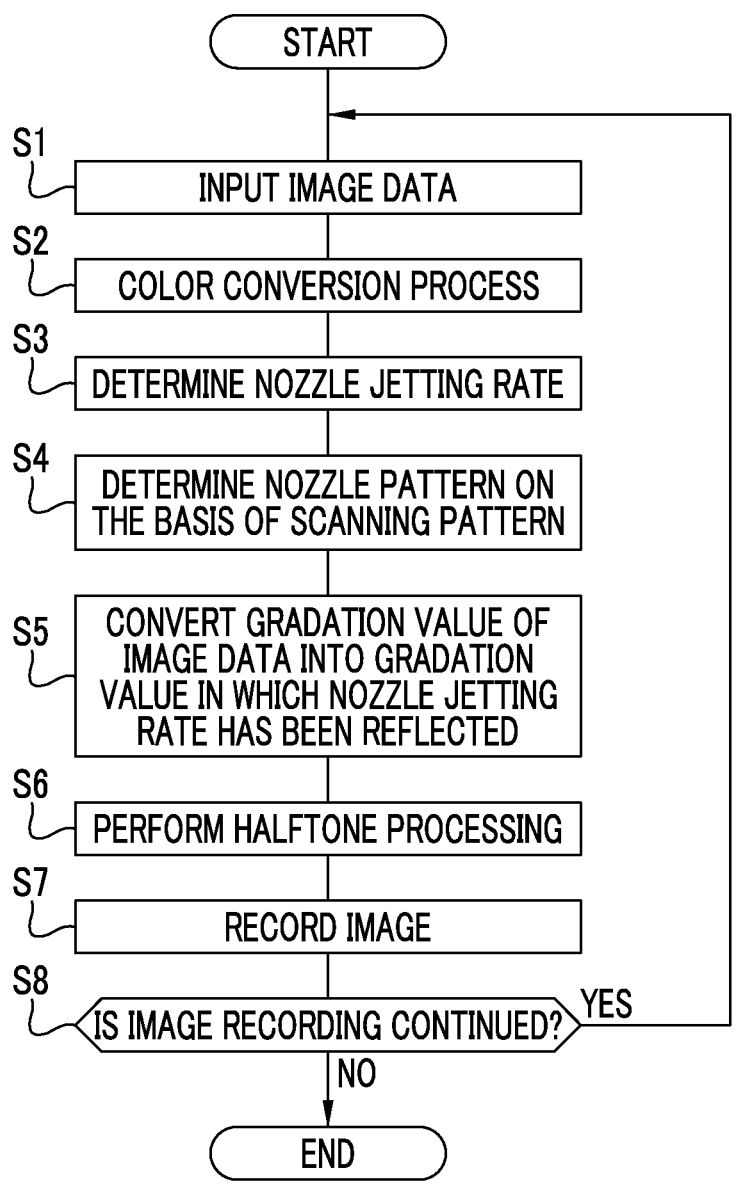
FIG. 12 is a flowchart illustrating the flow of an image recording process of the ink jet recording apparatus.

FIG. 12 is a flowchart illustrating the flow of the image recording process of the ink jet recording apparatus 10 having the above-mentioned structure. Next, the image recording process of the ink jet recording apparatus 10, particularly, an image processing method of the image processing unit 110 will be described with reference to FIG. 12.

When the ink jet recording apparatus 10 is turned on, each unit of the control device 102 operates on the basis of the control program 124a stored in the information storage unit 124. At that time, the image processing unit 110 of the control device 102 executes the control program 124a to function as the color conversion processing unit 71, the jetting rate determination unit 72, the nozzle pattern determination unit 73, the conversion unit 74, and the halftone processing unit 75.

When a recording start operation is performed through the input device 122 after the RGB image data 127 is input to the image input I/F 126 (Step S1), the ink jet recording apparatus 10 starts the image recording process.

The RGB image data 127 is input from the image input I/F 126 to the color conversion processing unit 71 and the color conversion processing unit 71 performs a color conversion process of converting the RGB image data 127 into the CMYK image data 127 (Step S2). Then, the image data 127 of each of C, M, Y, and K is input from the color conversion processing unit 71 to the conversion unit 74.

When the recording start operation is performed, the jetting rate determination unit 72 determines the nozzle jetting rate of each nozzle 62 such that the nozzle jetting rate of the nozzles 62 at both ends of the nozzle column 61 is less than the nozzle jetting rate of the nozzle 62 at the center of the nozzle column 61 and generates the nozzle jetting rate data L (see FIG. 9) (Step S3, a jetting rate determination step). In a case in which the user sets the nozzle jetting rate of each nozzle 62 using the input device 122 in advance, the jetting rate determination unit 72 determines the nozzle jetting rate of each nozzle 62 according to the settings and generates the nozzle jetting rate data L. Then, the nozzle jetting rate data L is input from the jetting rate determination unit 72 to the conversion unit 74.

In a case in which the nozzle pattern 77 is stored in advance in the information storage unit 124 together with the scanning pattern program 124b and the jetting rate pattern 78 for each combination of the nozzle pattern 77 and a plurality of types of nozzle jetting rate data L is stored in the information storage unit 124, the jetting rate determination unit 72 inputs an instruction to indicating which of a plurality of types of nozzle jetting rate patterns 78 that are stored in advance is used to the nozzle pattern determination unit 73.

When the recording start operation is performed, the nozzle pattern determination unit 73 determines the scanning pattern of the recording head 24 with reference to the scanning pattern program 124b stored in the information storage unit 124. Then, the nozzle pattern determination unit 73 determines which of the nozzles 62 of the recording head 24 is used to record each pixel of the image based on the image data 127, on the basis of the scanning pattern. In this way, the nozzle pattern 77 (see FIG. 10) is determined by the nozzle pattern determination unit 73 (Step S4, a nozzle pattern determination step). Then, the nozzle pattern 77 is input from the nozzle pattern determination unit 73 to the conversion unit 74. In a case in which the nozzle pattern 77 is stored in advance in the information storage unit 124 together with the scanning pattern program 124b, when the recording start operation is performed, the nozzle pattern determination unit 73 determines the nozzle pattern 77 corresponding to the scanning pattern program 124b stored in the information storage unit 124 and inputs the nozzle pattern 77 to the conversion unit 74.

The order in which the color conversion process, the nozzle jetting rate determination process, and the nozzle pattern determination process are performed is not limited to that illustrated in FIG. 12. The order may be appropriately changed or the processes may be performed in parallel.

The conversion unit 74 receives the image data 127 of each of C, M, Y, and K input from the color conversion processing unit 71, the nozzle jetting rate data L input from the jetting rate determination unit 72, and the nozzle pattern 77 input from the nozzle pattern determination unit 73 and starts to generate the jetting-rate-reflected image data 127L.

First, the conversion unit 74 compares the nozzle jetting rate data L with the nozzle pattern 77 and calculates the nozzle jetting rate of each nozzle 62 which records each pixel of the image data 127. In this way, the jetting rate pattern 78 (see FIG. 11) is calculated by the conversion unit 74. In addition, in a case in which the nozzle pattern 77 is stored in advance in the information storage unit 124 together with the scanning pattern program 124b and the jetting rate pattern 78 for each combination of the nozzle pattern 77 and a plurality of types of nozzle jetting rate data L is stored in the information storage unit 124, the nozzle pattern determination unit 73 determines the jetting rate pattern 78 corresponding to the corresponding nozzle jetting rate data L stored in the information storage unit 124 in response to the instruction from the jetting rate determination unit 72 and inputs the jetting rate pattern 78 to the conversion unit 74. The conversion unit 74 uses the jetting rate pattern 78 without any change.

Then, the conversion unit 74 multiplies the gradation value of each pixel of the image data 127 of each of C, M, Y, and K by the nozzle jetting rate of the jetting rate pattern 78 corresponding to each pixel or reflects the nozzle jetting rate in the gradation value, using a function or a conversion table, thereby converting the gradation value of each pixel of the image data 127 of each color (Step S5, a conversion step). In this way, the gradation value of each pixel of the image data 127 of each color is converted into a gradation value in which the jetting rate of each nozzle has been reflected and the jetting-rate-reflected image data 127L of each color is generated. The jetting-rate-reflected image data 127L of each color is input from the conversion unit 74 to the halftone processing unit 75.

The halftone processing unit 75 performs halftone processing for the jetting-rate-reflected image data 127L of each of C, M, Y, and K which is input to the halftone processing unit 75, using any one of the dither method, the error diffusion method, and the DBS method, to convert the jetting-rate-reflected image data 127L into dot data of each color (Step S6, a halftone process Step). Then, the dot data of each color is input from the halftone processing unit 75 to the jetting control unit 112. In a case in which there are a plurality of types of dot sizes (multiple values), the dot data of each color is multiple values corresponding to the type of dot size.

The jetting control unit 112 controls the head driving circuit 128 for driving the recording head 24 on the basis of the dot data of each of C, M, Y, and K which is input from the halftone processing unit 75 to control the jetting of ink from each nozzle 62 of the recording head 24. The recording medium transport control unit 104 controls the transport driving unit 114 such that the recording medium 12 is intermittently transported in the sub-scanning direction (X direction) and the carriage driving control unit 106 controls the main scanning driving unit 116 according to the scanning pattern program 124b (see FIG. 8) such that the recording head 24 is reciprocated in the main scanning direction (Y direction). In this way, the recording head 24 records an image based on the image data 127 on the recording medium 12 while being moved with respect to the recording medium 12 in the main scanning direction and the sub-scanning direction (Step S7).

Then, in a case in which image recording is continuously performed, the process from Step S1 to Step S7 is repeatedly performed (Step S8). In a case in which the nozzle jetting rate data L or the nozzle pattern 77 may be the same as that in the previous image recording process, the nozzle jetting rate data L, the nozzle pattern 77, or the jetting rate pattern 78 which has been previous calculated is used without any change. Therefore, in this case, some of the determination of the nozzle jetting rate (Step S3), the determination of the nozzle pattern 77 (Step S4), or the conversion of the gradation value (Step S5) may be omitted.

[Effect of this Embodiment]

According to the ink jet recording apparatus 10 having the above-mentioned structure, since the gradation value of each pixel of the image data 127 is converted into the gradation value in which the nozzle jetting rate has been reflected, it is possible to obtain a desired nozzle jetting rate (the nozzle jetting rate of the nozzles 62 at both ends of the nozzle column 61 is less than the nozzle jetting rate of the nozzle 62 at the center of the nozzle column 61) during image recording and to prevent banding. At that time, since a thinning process is not performed for the dot data of each color subjected to halftone processing, using a mask pattern, unlike JP2002-096455A, the granularity of an image is improved. In addition, since a method which reduces the nozzle jetting rate of the nozzles 62 at both ends of the nozzle column using the dither method is not used unlike JP2010-162770A, it is possible to obtain the effect of preventing the periodic occurrence of unevenness in a dither mask size, the effect of uniformizing a dot distribution to improve granularity, and the effect of reducing the nozzle jetting rate regardless of the duty. That is, when banding is prevented, it is possible to prevent the deterioration of image quality and to prevent banding regardless of the duty.

In a case in which the nozzle jetting rate is reflected in the gradation value of each pixel of the image data 127 as in the above-described embodiment, the number of dots recorded by the recording head 24 is less than that in a case in which it is assumed that the nozzle jetting rate is not reflected. As a result, even if the image data 127 corresponds to a solid pattern with the highest density, dots are not formed in 100% of the pixels.

Figure 13:
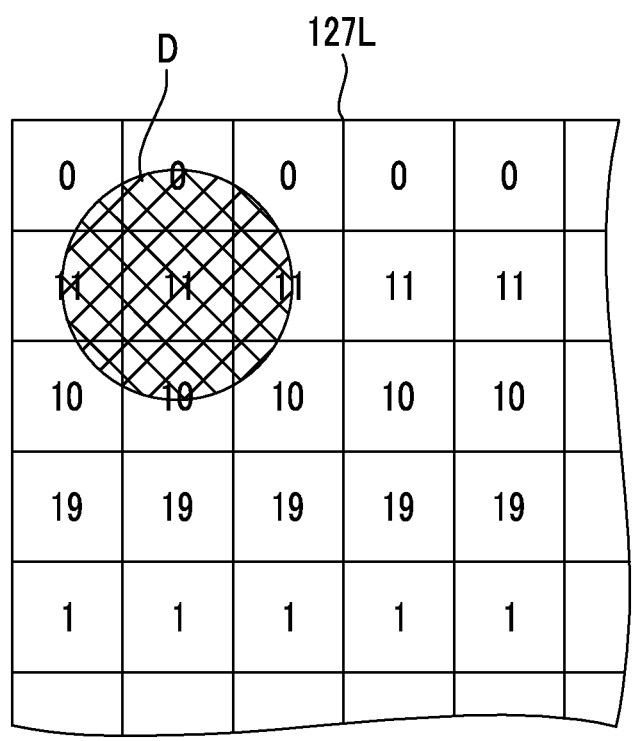
FIG. 13 is a diagram illustrating the diameter of a dot corresponding to a pixel of image data.

However, as illustrated in FIG. 13, in general, the resolution of the image data 127 is sufficiently high with respect to the diameter of a dot D recorded by each nozzle 62. Therefore, even if dots are not formed in 100% of the pixels, a recorded image reaches the highest density, which does not cause any special problems. FIG. 13 is a diagram illustrating the diameter of the dot D with respect to each pixel of the image data 127.

[Other Embodiments of Ink Jet Recording apparatus]

As illustrated in FIG. 13, since the resolution of the image data 127 is significantly greater than the diameter of the dot, no special problems occur even if the number of dots recorded by the recording head 24 is reduced. The nozzle jetting rate may be corrected as follows such that the number of dots is equal to the number of dots in a case in which it is assumed that the nozzle jetting rate is not reflected. Specifically, each of the nozzle jetting rates (L0, L1, L2, . . . which will be described below) of the nozzle jetting rate data L is multiplied by a correction value $\alpha$ to be corrected such that the numbers of dots before and after the nozzle jetting rate is reflected are equal to each other. The correction value $\alpha$ is determined as follows.

First, it is assumed that the repetition period of each nozzle 62 in the main scanning direction (Y direction) and the sub-scanning direction (X direction) is a unit area and the number of dots to be arranged in a unit area is N. In addition, it is assumed that the area ratio of the pixels corresponding to each nozzle 62 (nozzle No0, nozzle No1, . . . ) in the unit area is r0, r1, . . . . In this case, it is assumed that the number of dots "to be recorded" by each nozzle 62 is r0×N, r1×N, . . . . For example, in a case in which N is 40 and r0=r1==4/120 is established, the number of dots is r0×N=r1×N= . . . =4/3.

In a case in which the nozzle jetting rate of the nozzle 62 with nozzle No0 and the nozzle jetting rate of the nozzle 62 with nozzle No1 which are defined by the nozzle jetting rate data L are L0 and L1, respectively, and the nozzle jetting rates of the nozzles 62 with nozzle numbers after nozzle No2 are similarly defined, the number of dots which are "actually recorded" by each nozzle 62 is "r0×N×L0", "r1×N×L1", . . . . For example, as described above, in a case in which L0=0.0, L1=0.05, . . . is established, the number of dots is "r0×N×L0"=0, "r1×N×L1"=[(4/3)×0.05], . . . . Therefore, the number of dots which are "actually recorded" by each nozzle 62 in the unit area is N×(r0×L0+r1×L1+ . . . ).

The number of dots recorded by the recording head 24 is equal to the number of dots in a case in which the nozzle jetting rate is not reflected (that is, in a case in which it is assumed that the conversion unit 74 does not perform gradation transformation). Therefore, the nozzle jetting rates (L0, L1, . . . ) of each nozzle 62 are corrected such that N=N×(r0×L0+r1×L1+ . . . ), that is, the following Expression (1) is satisfied:

$$(r0 \times L0 + r1 \times L1 + \ldots ) = 1. \quad (1)$$

Here, in a case in which the number of nozzles of the recording head 24 is K (K=30 in this embodiment), the area ratio (r0, r1, . . . ) of each nozzle 62 generally satisfies the following Expression (2):

$$r0 = r1 = r2 = \ldots = 1/K = 1/30. \quad (2)$$

Each of the nozzle jetting rates (L0, L1, . . . ) is multiplied by the correction value α [α=K/(L0+L1+L2+ . . . )] to be corrected such that the following Expression (3) is satisfied, on the basis of the above-mentioned Expressions (1) and (2), without changing each of the nozzle jetting rates (L0, L1, . . . ):

$$L0 + L1 + L2 + \ldots = K. \quad (3)$$

As a result, the above-mentioned Expression (1) is satisfied. That is, the number of dots recorded by the recording head 24 can be equal to the number of dots in a case in which it is assumed that the nozzle jetting rate is not reflected.

Therefore, in the structure illustrated in FIG. 8, each of the nozzle jetting rates (L0, L1, . . . ) of the nozzle jetting rate data L used by the conversion unit 74 is changed to a value obtained by multiplying each of the nozzle jetting rates (L0, L1, . . . ) by the correction value α to make the number of dots recorded by the recording head 24 equal to the number of dots in a case in which the nozzle jetting rate is not reflected.

Figure 14:
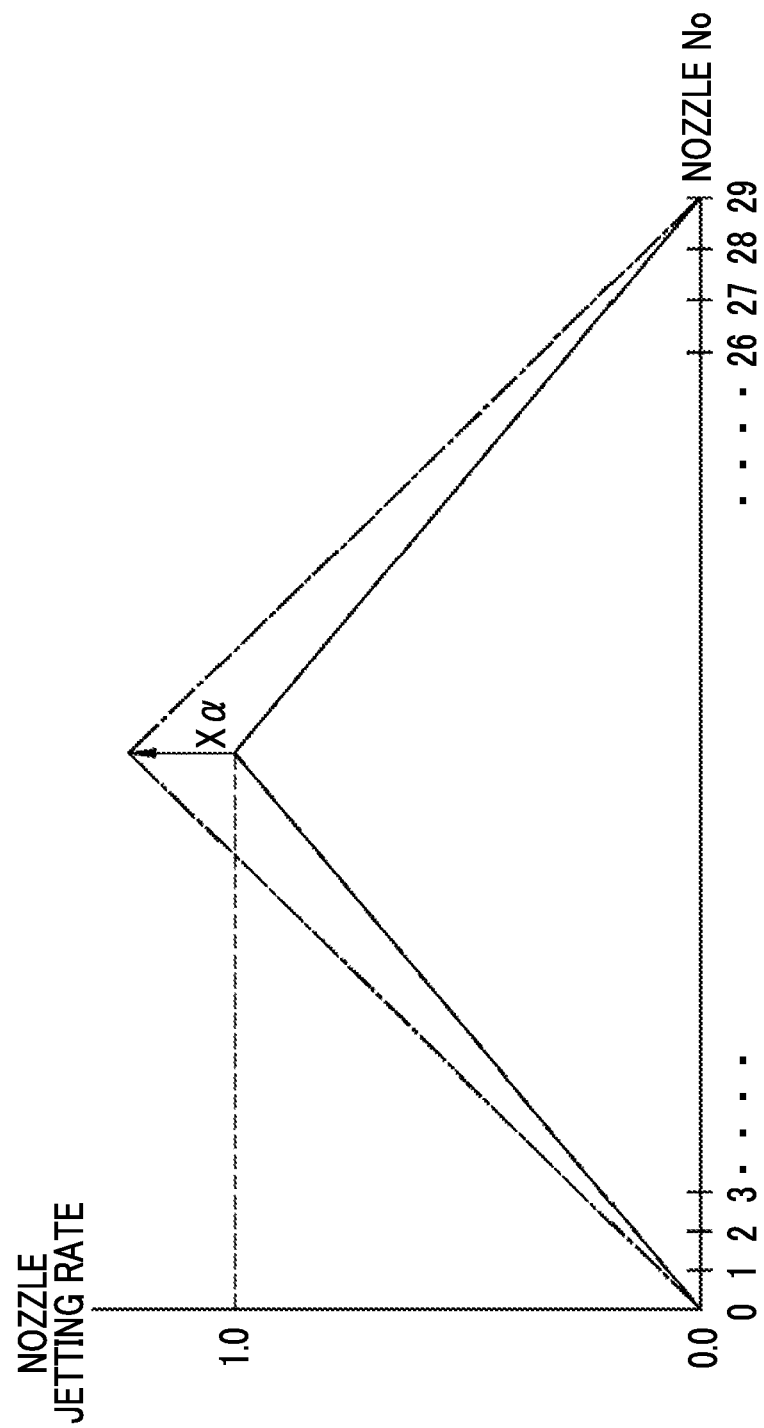
FIG. 14 is a diagram illustrating a corrected nozzle jetting rate.

FIG. 14 is a diagram illustrating the corrected nozzle jetting rate. As illustrated in FIG. 14, since the correction value α is greater than 1 (α=1 only in a case in which L0=L1= . . . =1 is established), the nozzle jetting rate is likely to be greater than 1. At that time, in a case in which the value obtained by multiplying the gradation value of each pixel of the image data 127 by the nozzle jetting rate is equal to or greater than 100% (255 in the case of 8-bit image data), the converted gradation value may be 100%.

[Others]

In the above-described embodiment, the nozzle jetting rate of the nozzles 62 at both ends of the nozzle column 61 is set to be less than the nozzle jetting rate of the nozzle 62 at the center of the nozzle column 61, in order to prevent banding which occurs when an image is recorded by the multi-pass (serial) recording head 24. However, the nozzle jetting rate of each nozzle may be appropriately changed depending on, for example, the type of recording head or a recording method.

In the above-described embodiment, the ink jet recording apparatus 10 including the serial recording head 24 is given as an example. However, the invention can also be applied to an ink jet recording apparatus including a single-pass recording head (for example, a recording head having a structure in which a plurality of head modules are connected in the main scanning direction).

In the case of the single-pass recording head, an overlap region is provided in order to smooth the connection between a plurality of head modules and to prevent a dot formation position at the end of each head module or errors in the amount of ink jetted from being conspicuous.

Figure 15A:
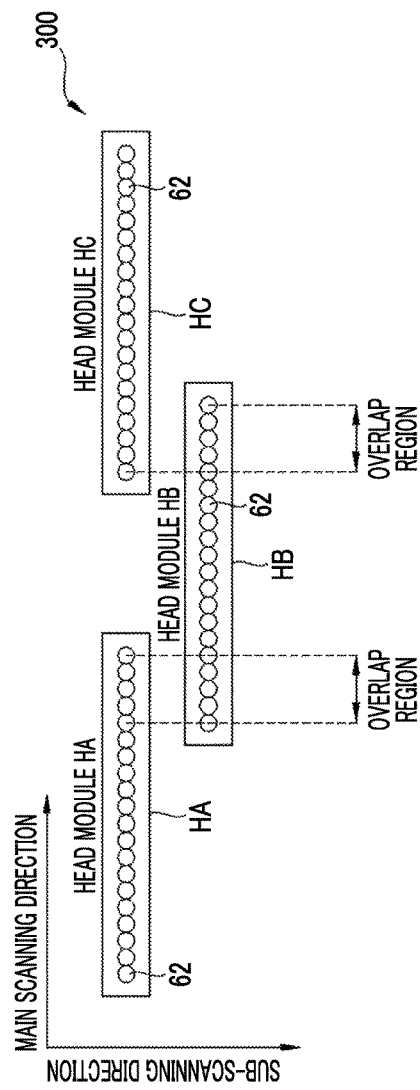
FIG. 15A is a diagram schematically illustrating a single-pass recording head.

FIG. 15A is a diagram schematically illustrating a single-pass recording head 300 and FIG. 15B is a graph illustrating the nozzle jetting rate of each nozzle 62 of the recording head 300. As illustrated in FIG. 15A, the recording head 300 is provided with an overlap region between a head module HA and a head module HB and an overlap region between the head module HB and a head module HC. The nozzles 62 of the head modules HA and HB and the head modules HB and HC are alternately used in the sub-scanning direction to form dots in each overlap region. However, streak unevenness or density unevenness with the period of each head module occurs in the overlap region due to a difference in nozzle position or the amount of ink jetted between the head modules HA and HB and between the head modules HB and HC. For this problem, as illustrated in FIG. 15B, the nozzle jetting rate of the nozzle 62 which is closer to the end of the head module is set to the smaller value in the overlap region and is reflected in the gradation value of each pixel of image data. In this way, it is possible to prevent streaks or unevenness.

In the above-described embodiment, the wide format printer which records a color image on the recording medium 12 using ultraviolet-curable-type ink is given as an example of the ink jet recording apparatus. However, the invention can be applied to an ink jet recording apparatus which records an image on a recording medium using various types of ink. In the above-described embodiment, density is changed to prevent banding or streak unevenness. However, in the ink jet recording apparatus, banding or streak unevenness also occurs due to a change in gloss. Therefore, the invention is also effective in solving this problem. Similarly, the invention is effective in preventing banding or streak unevenness caused by a change in a dot pattern.

Figure 16A:
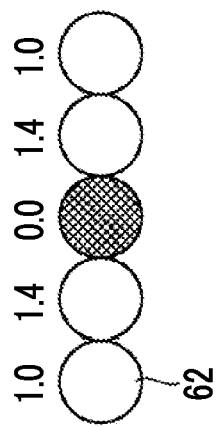
FIG. 16A is a diagram illustrating a state in which non-jetting does not occur in nozzles.
Figure 16B:
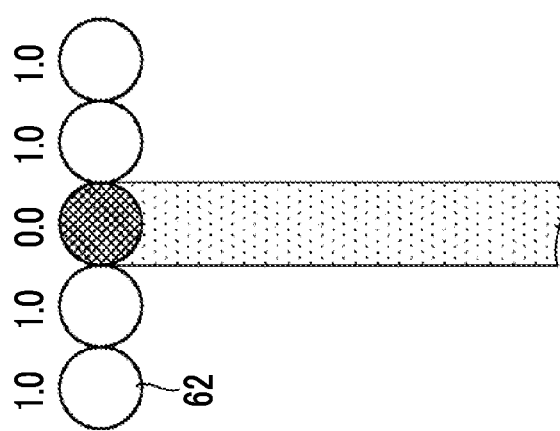
FIG. 16B is a diagram illustrating a state in which non-jetting occurs in a nozzle.
Figure 16C:
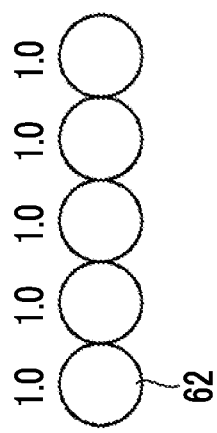
FIG. 16C is a diagram illustrating an application example of the invention.

In some cases, a specific nozzle of the recording head is not capable of discharging (jetting) ink due to clogging, regardless of whether the recording head is a serial type or a single-pass type. FIG. 16(A) is a diagram illustrating a state in which non-jetting does not occur in the nozzles, FIG. 16(B) is a diagram illustrating a state in which non-jetting occurs in the nozzles, and FIG. 16(C) is a diagram illustrating an application example of the invention. When non-jetting occurs in a nozzle 62 (a hatched nozzle 62 in FIG. 16(B)) in the state illustrated in FIG. 16(A), as illustrated in FIG. 16(B), no dots are formed in the line which is recorded by the nozzle and streaks (NG) caused by non-jetting occur. The invention is also effective in solving this problem. That is, as illustrated in FIG. 16(C), the nozzle jetting rates of the nozzles 62 around a nozzle 62 which is detected as a non-jetting nozzle are increased for compensation. Therefore, it is possible to reduce streaks (NG) caused by non-jetting.

In the above-described embodiment, first, the nozzle jetting rate corresponding to each pixel of the image data 127 of each of C, M, Y, and K is reflected in the gradation value of each pixel to generate the jetting-rate-reflected image data 127L. Then, halftone processing is performed for the jetting-rate-reflected image data 127L of each of C, M, Y, and K to generate dot data of each color and each head and the jetting of ink from each nozzle are controlled on the basis of the dot data. However, in the case of an ink jet recording apparatus having a plurality of types of dot sizes (multiple values), a nozzle jetting rate corresponding to each pixel of the dot data (multiple values) of each color may be reflected in the dot data to generate jetting-rate-reflected dot data and each head and the jetting of ink from each nozzle may be controlled on the basis of the jetting-rate-reflected dot data. In the case of this structure, the jetting rate is not reflected in the original image data 127 of each of C, M, Y, and K and halftone processing or quantization is performed for the original image data 127 to generate dot data or the dot data is generated without performing any processing.

In the above-described embodiment, the control device 102 of the ink jet recording apparatus 10 functions as the color conversion processing unit 71, the jetting rate determination unit 72, the nozzle pattern determination unit 73, the conversion unit 74, and the halftone processing unit 75 on the basis of the control program 124*a*. However, the invention is not limited to this structure. A computer other than the ink jet recording apparatus 10 may function as each processing unit.

The invention is not limited to the above-described embodiment and various modifications and changes of the invention can be made without departing from the scope and spirit of the invention.

EXPLANATION OF REFERENCES

10: ink jet recording apparatus
12: recording medium
24: recording head
61: nozzle column
62: nozzle
72: jetting rate determination unit
73: nozzle pattern determination unit
74: conversion unit
75: halftone processing unit
77: nozzle pattern
110: image processing unit
112: jetting control unit
114: transport driving unit
116: main scanning driving unit
127: image data
127L: jetting-rate-reflected image data

What is claimed is:

1. An image processing device comprising:
a jetting rate determination unit that determines a jetting rate indicating an ink jetting rate of each of a plurality of nozzles which jet ink in a recording head including the nozzles;
a nozzle pattern determination unit that determines a nozzle pattern indicating which of the plurality of nozzles of the recording head is used to record each pixel of an image on a recording medium; and
a conversion unit that reflects the jetting rate of the nozzle which records each pixel in a gradation value of each pixel of the image on the basis of a determination result of the jetting rate determination unit and a determination result of the nozzle pattern by the nozzle pattern determination unit to convert the gradation value of each pixel.

2. The image processing device according to claim 1, wherein the jetting rate determination unit determines the jetting rate of each nozzle of the recording head of a serial type which has a nozzle column including the nozzles arranged in a sub-scanning direction parallel to a transport direction of the recording medium and records the image on the recording medium while being moved with respect to the recording medium in the sub-scanning direction and a main scanning direction intersecting the sub-scanning direction, and
the nozzle pattern determination unit determines the nozzle pattern corresponding to the serial recording head.

3. The image processing device according to claim 2, wherein the jetting rate determination unit determines the jetting rates such that the jetting rate of the nozzle which is disposed at an end of the nozzle column is less than the jetting rate of the nozzle which is disposed at the center of the nozzle column.

4. The image processing device according to claim 2, wherein the nozzle pattern determination unit determines the nozzle pattern on the basis of a scanning pattern when the recording head is moved with respect to the recording medium.

5. The image processing device according to claim 1, further comprising:
a halftone processing unit that performs halftone processing for the gradation value of each pixel converted by the conversion unit to generate dot data which is used to control the jetting of the ink from each nozzle.

6. The image processing device according to claim 5, wherein the halftone processing unit performs the halftone processing using any one of a dither method, an error diffusion method, and a direct binary search method.

7. An ink jet recording apparatus comprising:
a recording head having a plurality of nozzles that jet ink;
a moving unit that moves the recording head with respect to a recording medium;
the image processing device according to claim 5; and
a jetting control unit that controls the jetting of the ink from the recording head on the basis of the dot data generated by the halftone processing unit.

8. An image processing method comprising:
a jetting rate determination step of determining a jetting rate indicating an ink jetting rate of each of a plurality of nozzles which jet ink in a recording head including the nozzles;
a nozzle pattern determination step of determining a nozzle pattern indicating which of the plurality of nozzles of the recording head is used to record each pixel of an image on a recording medium; and
a conversion step of reflecting the jetting rate of the nozzle which records each pixel in a gradation value of each pixel of the image on the basis of a determination result in the jetting rate determination step and a determination result of the nozzle pattern in the nozzle pattern determination step to convert the gradation value of each pixel.

9. The image processing method according to claim 8, wherein, in the jetting rate determination step, the jetting rate of each nozzle of the recording head of a serial type, which has a nozzle column including the nozzles arranged in a sub-scanning direction parallel to a transport direction of the recording medium and records the image on the recording medium while being moved with respect to the recording medium in the sub-scanning direction and a main scanning direction intersecting the sub-scanning direction, is determined, and in the nozzle pattern determination step, the nozzle pattern corresponding to the serial recording head is determined.

10. The image processing method according to claim 9, wherein, in the jetting rate determination step, the jetting rate of the nozzle which is disposed at an end of the nozzle column is less than the jetting rate of the nozzle which is disposed at the center of the nozzle column.

11. The image processing method according to claim 8, further comprising:
a halftone processing step of performing halftone processing for the gradation value of each pixel converted in the conversion step to generate dot data which is used to control the jetting of the ink from each nozzle.

* * * * *